US006856414B1

United States Patent
Haneda et al.

(10) Patent No.: US 6,856,414 B1
(45) Date of Patent: Feb. 15, 2005

(54) IMAGE DATA COMMUNICATION SYSTEM, SERVER SYSTEM, METHOD OF CONTROLLING OPERATION OF SAME, AND RECORDING MEDIUM STORING PROGRAM FOR CONTROL OF SERVER SYSTEM

(75) Inventors: Norihisa Haneda, Asaka (JP); Yoshinori Ohta, Asaka (JP); Keisuke Tanaka, Asaka (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/482,275

(22) Filed: Jan. 13, 2000

(30) Foreign Application Priority Data

Jan. 14, 1999 (JP) .......................................... 11-008097
Mar. 24, 1999 (JP) .......................................... 11-079569

(51) Int. Cl.[7] .......................... G06F 15/16; G06F 17/30
(52) U.S. Cl. ................... 358/1.15; 709/247; 707/104.1
(58) Field of Search .............................. 358/1.9, 1.15, 358/518, 539; 382/167, 166, 232, 305, 243; 709/246, 247; 707/104.1

(56) References Cited

U.S. PATENT DOCUMENTS

| 4,992,887 A | * | 2/1991 | Aragaki ....................... 358/403 |
| 5,973,731 A | * | 10/1999 | Schwab ....................... 348/161 |
| 5,999,664 A | * | 12/1999 | Mahoney et al. ........... 382/305 |
| 6,018,774 A | * | 1/2000 | Mayle et al. ................ 709/250 |
| 6,151,636 A | * | 11/2000 | Schuster et al. ............ 709/247 |
| 6,226,412 B1 | * | 5/2001 | Schwab ....................... 382/232 |
| 6,281,874 B1 | * | 8/2001 | Sivan et al. ................. 345/660 |
| 6,321,231 B1 | * | 11/2001 | Jebens et al. ............ 707/104.1 |
| 6,571,015 B1 | * | 5/2003 | Matsuo et al. .............. 382/232 |
| 6,583,799 B1 | * | 6/2003 | Manolis et al. ............. 345/838 |
| 6,608,628 B1 | * | 8/2003 | Ross et al. .................. 345/619 |
| 2002/0003903 A1 | * | 1/2002 | Engeldrum et al. ......... 382/233 |
| 2002/0012453 A1 | * | 1/2002 | Hashimoto et al. ......... 382/112 |

\* cited by examiner

Primary Examiner—Scott A. Rogers
(74) Attorney, Agent, or Firm—McGinn & Gibb, PLLC

(57) ABSTRACT

Original images, large images, medium images and thumbnail images are registered with a server system. An original-image file is transmitted from a client computer to the server system. The server system converts the format of the original-image file to generate a large-image file, generates a medium-image file, in which the quantity of data is less than that of the large-image file, from the large-image file, and generates a thumbnail-image file, in which the quantity of data is less than that of the medium-image file, from the medium-image file. The original-image file, large-image file, medium-image file and thumbnail-image file are placed on one folder and stored in an image file unit. After the folder containing the original-image file, etc., has been stored in the image file unit, the user of a client computer having access privileges is capable of accessing files such as the large-image file.

18 Claims, 37 Drawing Sheets

Fig. 3

| USER TABLE | |
|---|---|
| User ID | USER ID |
| Group ID | GROUP NO. |
| UserName | USER NAME |
| Password | PASSWORD |
| EntryOK | PRIVILEGE TO ACCESS REGISTRATION PAGE (True/False) |
| SearchOK | PRIVILEGE TO ACCESS SEARCH PAGE (True/False) |
| ResultOK | PRIVILEGE TO ACCESS PAGE DISPLAYING LIST OG SEARCH RESULTS (True/False) |
| DetailOK | PRIVILEGE TO ACCESS DETAILED-INFORMATION PAGE (True/False) |
| BinaryOK | BINARY-ACCESS PRIVILEGE (True/False) |

Fig. 4

| NEXT-ID TABLE | |
|---|---|
| CurrentID | CURRENT RECORD NO. |
| NextID | NEXT RECORD NO. |

Fig. 5

| GROUP-ID TABLE | |
|---|---|
| GroupID | GROUP NO. |
| GroupName | GROUP NAME |

Fig. 6

| DATA TABLE | |
|---|---|
| RecordID | RECORD NO. |
| OwnerID | OWNER ID |
| NumOfBinary | NUMBER OF ATTACHMENT FILES |
| ImageInfo1 | KEYWORD 1 |
| ImageInfo2 | KEYWORD 2 |
| ImageInfo3 | KEYWORD 3 |
| ImageInfo4 | KEYWORD 4 |

Fig. 7

| ACCESS TABLE | |
|---|---|
| RecordID | RECORD NO. |
| AccessID0 | GROUP NO. HAVING PRIVILEGE 0 |
| AccessID1 | GROUP NO. HAVING PRIVILEGE 1 |
| AccessID2 | GROUP NO. HAVING PRIVILEGE 2 |
| AccessID3 | GROUP NO. HAVING PRIVILEGE 3 |
| AccessID4 | GROUP NO. HAVING PRIVILEGE 4 |

Fig. 8

| BINARY TABLE | |
|---|---|
| RecordID | RECORD NO. |
| OwnerID | OWNER ID |
| BinaryNum | BINARY-FILE NO. |
| FileName | FILE NAME |
| ByteSize | BYTE SIZE OF BINARY FILE |

Fig. 14  IMAGE INFORMATION REGISTRATION

Fig. 40

PRODUCT INFORMATION TABLE

| BAR-CODE NO. |
| --- |
| PRODUCT NAME (FinePix 700) |
| PRODUCT INFORMATION 1 (DIGITAL CAMERA) |
| PRODUCT INFORMATION 2 (PRICE) |
| PRODUCT INFORMATION 3 (INVENTORY) |
| PRODUCT INFORMATION 4 |

Fig. 41

IMAGE TABLE

| IMAGE INDEX |
| --- |
| BAR-CODE NO. |
| DATE OF PHOTOGRAPHY |
| POSITION INFORMATION |

Fig. 42

INDEX MANAGEMENT DATABASE

| CURRENT IMAGE INDEX |
| --- |
| NEXT IMAGE INDEX |

IMAGE DATA COMMUNICATION SYSTEM, SERVER SYSTEM, METHOD OF CONTROLLING OPERATION OF SAME, AND RECORDING MEDIUM STORING PROGRAM FOR CONTROL OF SERVER SYSTEM

BACKGROUND OF THE INVENTION

1. Field of the Invention

This invention relates to an image data communication system in which a plurality of client computers and a server system are capable of communicating with each other via a network, a server system and a method of controlling the operation thereof, and a recording medium storing a program for controlling the server system.

The invention relates further to a registration system for an image database, an image database search system, registration and search methods, and a recording medium storing a program for controlling an image database.

2. Description of the Related Art

An image data communication system for uploading image data from a client computer to a server system is constructed via a network such as the Internet. By accessing the server system, image data that has been uploaded to the server system is downloaded to the client computer.

If image data containing a large quantity of data is uploaded to the server system, an image printed using this image data will have a high quality. However, downloading a large quantity of image data takes time. If image data containing a small quantity of data is uploaded to the server system in order to shorten download time, the image quality of the image printed using this image data will decline.

Some image databases allow the input of a keyword (search information), which is for searching image data that has been registered in the database, using a keyboard or the like. Thus, means for inputting the keyword is required.

In some arrangements, alphanumeric characters contained in an image are extracted and the extracted alphanumeric characters are registered as a keyword in an image database in association with the image data. However, such an arrangement requires a special device to extract the alphanumeric characters from the image.

SUMMARY OF THE INVENTION

Accordingly, an object of the present invention is to arrange it so that image data possessing a plurality of image qualities can be uploaded to a server system.

Another object of the present invention is to arrange it so that image data and search information for searching the image data can be registered in an image database in a comparatively simple manner.

An image data communication system according to the present invention is such that a plurality of client computers and a server system are capable of communicating with each other via a network.

The client computer has an original-image data specifying unit for specifying original-image data that is to be transmitted to the server system, and an original-image data transmitting unit for transmitting the original-image data, which has been specified by the original-image data specifying unit, to the server system.

The server system has an original-image data receiving unit for receiving the original-image data transmitted from the original-image data transmitting unit; an image data generating unit (image data generating means), which responds to receipt of the original-image data by the original-image data receiving unit, for generating reduced-data-quantity image data of two stages representing at least two images possessing data quantities of at least two stages in each of which the quantity of data is less than that of the original-image data; and a unit (means) for associating the original-image data, which has been received by the original-image data receiving unit, and the reduced-data-quantity image data that has been generated by the image data generating unit.

The present invention provides also a method of controlling the operation of the above-described server system. Specifically, there is provided a method of controlling the operation of a server system capable of communicating with a client computer via a network, comprising the steps of: receiving original-image data that is sent; generating, in response to receipt of the original-image data, reduced-data-quantity image data of two stages representing at least two images possessing data quantities of at least two stages in each of which the quantity of data is less than that of the original-image data; and associating the original-image data that has been received and the reduced-data-quantity image data that has been generated.

The present invention provides also a recording medium storing a program for controlling the operation of the above-described server system.

The original-image data is transmitted from the client computer of the server system.

The original-image data is received by the server system, whereupon the server system generates reduced-data-quantity image data of two stages representing at least two images possessing data quantities of at least two stages in which the quantity of data is less than that of the original-image data. The format of the generated reduced-data-quantity image data of two stages may be the same as or different from that of the original-image data. This means that the server system may obtain original-image data representing an original image, medium-image data the quantity of data of which is less than that of the original-image data, and thumbnail-image data the quantity of data of which is less than that of the medium-image data.

When an image is to be checked at the client computer, a first item of reduced-data-quantity image data, which contains the smaller quantity of data, is transmitted from the server system to the client computer. Since the quantity of data is small, the time needed to transmit the data to the client computer is shortened. When confirmation of an image cannot be performed based upon the image represented by the first item of reduced-data-quantity image data, a second item of reduced-data-quantity image data is transmitted to the client computer. Because the quantity of data in the image represented by the second item of reduced-data-quantity image data is greater than that of the first item of reduced-data-quantity image data, the image is easier to see. This makes it easier to confirm the image. In a case where an image having an even greater quantity of data is to be obtained, the original-image data is transmitted from the server system to the client computer. This makes it possible to print an image having a higher image quality.

Associating the original-image data and the reduced-data-quantity image data may be performed by storing the data in the same file or by assigning the same number to the data.

An arrangement may be adopted in which the server system generates image data having a predetermined specific data format that is independent of the data format of the original-image data.

Image data has a variety of formats and cases arise in which only image data having a predetermined specific data format is required at the client computer. When image data (the original-image data, the reduced-data-quantity image data, etc.) is transmitted from the server system to the client computer in such cases, the format of the data is converted to the specific data format of the client computer.

Since the conversion is made to image data having the predetermined specific format, the data format conversion need not be made at the client computer.

It is preferred that the image data generating unit generate reduced-data-quantity image data of a prescribed format (a data format the same as or different from that of the original-image data) that is independent of the data format of the original-image data.

In a case where image data of reduced data quantity is utilized, it is unnecessary to perform the format conversion at the time of such utilization. For example, in a case where an image of reduced data quantity represented by reduced-data-quantity image data of a prescribed format can be displayed or printed, etc., it is unnecessary to perform the format conversion again for the sake of such display or printing.

It is preferred that the server system be further provided with a memory in which the quantity of original-image data that can be stored is allocated beforehand to each client computer, the memory storing temporarily the original-image data that has been received by the original-image data receiving unit. In this case, the original-image data transmitting unit of the client computer sends the server system the original-image data having a quantity of data less than the quantity of data allocated beforehand.

Thus, the client computer sends the server system the original-image data the quantity of which conforms to the data quantity that has been allocated to this client computer. This makes it possible to prevent a specific client computer from utilizing the entire memory of the server and assures that a large number of client computers will be capable of accessing the server system. The above-mentioned memory of the server system need not be increased to cope with the number of client computers that access the server system.

It is preferred that the server system be provided with a storage unit for storing the original-image data and the reduced-data-quantity image data of two stages.

An arrangement may be adopted in which the server system applies color adjustment processing to at least one item of image data among the original-image data and reduced-data-quantity image data of two stages.

The fact that color adjustment processing is executed makes it possible to obtain an image having good color reproducibility.

The client computer may further be provided with a data specifying unit for specifying image data that is to undergo color adjustment among the original-image data and reduced-data-quantity image data of two stages, and a specifying-data transmitting unit for sending the server system specifying data which represents the image data that has been specified by the data specifying unit.

In this case, the server system is further provided with a specifying-data receiving unit for receiving the specifying data that has been transmitted from the specifying-data transmitting unit. The color adjustment unit (color adjusting means) applies the color adjustment processing to image data, which has been specified by the specifying data received by the specifying-data receiving unit, among the original-image data and reduced-data-quantity image data of two stages.

The client computer is further includes an image display unit for displaying an image. The image display unit displays an image represented by image data having a prescribed format. In this case the server system is further provided with a format conversion unit (format conversion means) for converting the original-image data received by the original-image data receiving unit to a format that is capable of being displayed by the image display unit. The image data generating unit generates the reduced-data-quantity image data having a format that is capable of being displayed by the image display unit.

Thus the server system converts the format of the reduced-data-quantity image data to that of image capable of being displayed on the display unit of the client computer. Image data that has been transmitted from the server system to the client computer is capable of displaying an image without being subjected to a format conversion in the client computer.

The client computer further includes a transmission requesting unit for sending the server system a request to transmit at least one item of image data among the original-image data and reduced-data-quantity image data of two stages that has been stored in the storage unit.

In this case, the server system further includes a transmission-request receiving unit for receiving the transmission request transmitted from the transmission requesting unit of the client computer; a first reception-privilege determination unit for determining whether the privilege to receive image data specified by the transmission request received by the transmission-request receiving unit resides with the client computer that issued the transmission request; and a data transmitting unit, which is responsive to a determination by the first reception-privilege determination unit to the effect that the privilege resides with the client computer, for reading the image data specified by the transmission request out of the memory unit and transmitting this image data to the client computer, and which is responsive to a determination by the first reception-privilege determination unit to the effect that the privilege does not reside with the client computer, for sending the client computer data indicating that transmission is not allowed.

Thus, the transmission request is transmitted from the client computer to the server system. In a case where reception privilege resides with the client computer that transmitted the transmission request, image data that conforms to the transmission request is transmitted from the server system to the client computer.

By granting the reception privilege to a specific client computer, it is possible to allow the specific client computer to receive the image data. The reception privilege can be decided in dependence upon the image data. For example, it is possible to prescribe a client computer that is denied a privilege to receive any image data, a client computer that is allowed to receive only the first item of reduced-data-quantity image data, a client computer that is allowed to receive both of the two items of reduced-data-quantity image data, and a client computer that is allowed to receive all image data inclusive of the original-image data.

The server system may further include an end-message transmitting unit, which is responsive to storage of the original-image data and the reduced-data-quantity image data of two stages in the storage unit, for transmitting a message indicative of end of storage to the client computer that transmitted the original-image data.

By receiving the end message, the client computer is capable of ascertaining the fact that the original-image data has been stored in the storage unit of the server system.

The client computer may further include an image search-condition input unit for inputting image search conditions, and an image search-condition transmitting unit for sending the client computer the image search conditions that have been input from the image search-condition input unit.

In this case, it is preferred that the server system include an image search-condition receiving unit for receiving image search conditions that have been transmitted from the image search-condition transmitting unit; a search unit (search means) for searching, on the basis of the image search conditions received by the image search-condition receiving unit, at least one item of data among the original-image data and reduced-data-quantity image data of the two stages stored in the storage unit; and a search-result information transmitting unit for sending the client computer information (the image represented by the image data, conditions that match the image search conditions, an indication of whether the image data of interest exists or not, etc.) relating to results of the search conducted by the search unit.

Thus, by inputting image search conditions from the client computer, an image conforming to the input image search conditions is searched for in the server system. Information relating to the results of the search is transmitted from the server system to the client computer. By inputting the image search conditions at the client computer, information relating to the results of the search is obtained at the server system.

The server system may further include a second reception-privilege determination unit for determining whether the privilege to receive image data, which has been found as a result of the search conducted by the search unit, resides with the client computer. In this case, the search-result information transmitting unit, in response to a determination by the second reception-privilege determination unit to the effect that the privilege resides with the client computer, sends the client computer the image data found as a result of the search conducted by the search unit.

Thus, the image data is transmitted to the client computer that has the privilege to receive the data.

An image database registration system according to the present invention comprises: an image file input unit for inputting an image file which includes an additional-information recording area in which additional information has been recorded and an image-data recording area in which image data representing an image has been recorded; an additional-information reading unit for reading the additional information that has been recorded in the additional-information recording area included in the image file input from the image file input unit; an image data reading unit for reading the image data that has been recorded in the image-data recording area included in the image file input from the image file input unit; and a storage control unit for storing the additional information that has been read by the additional-information reading unit and the image data that has been read by the image data reading unit in a storage unit in association with each other.

The present invention provides also a method suited to this system. Specifically, the method comprises the steps of: inputting an image file which includes an additional-information recording area in which additional information has been recorded and an image-data recording area in which image data representing an image has been recorded; reading the additional information that has been recorded in the additional-information recording area included in the image file that has been input; reading the image data that has been recorded in the image-data recording area included in the image file that has been input; and storing the additional information that has been read and the image data that has been read in a storage unit in association with each other.

The present invention provides a program for controlling the above-described image database registration system.

When additional information and image data have thus been stored in the storage unit in association with each other, image data can be searched as set forth below.

Specifically, an image database search system according to the present invention comprises: a storage unit in which additional information, which has been recorded in an additional-information recording area of an image file, and image data, which has been recorded in an image-data recording area of the image file, are stored in association with each other; an additional-information input unit for inputting additional information; a search unit (search means) which, on the basis of the additional information that has been input from the additional-information input unit, retrieves the corresponding image data from the storage unit; and an image data output unit for outputting image data that has been found by the search conducted by the search unit.

The present invention provides also a method suited to this system. Specifically, the method comprises the steps of: storing additional information, which has been recorded in an additional-information recording area of an image file, and image data, which has been recorded in an image-data recording area of the image file, in a storage unit in association with each other; inputting additional information; on the basis of the additional information that has been input, retrieving the corresponding image data from the storage unit; and outputting image data that has been found by retrieval.

The present invention provides also a recording medium storing a program for executing the above-described image database search system.

In accordance with the present invention, additional information is recorded in the additional-information recording area of the image file and image data is recorded in the image-data recording area of the image file. The additional information that has been recorded in the additional-information recording area and the image data that has been recorded in the image-data recording area are stored in the storage unit (second storage unit) in association with each other.

Additional information can be recorded in an image file that includes an additional-information recording area without using an input unit for inputting a keyword. Image data can be retrieved using the additional information as search information. Further, there is no need for a special device for extracting alphanumeric characters from an image, as in a case where alphanumeric characters contained in an image are used as a keyword.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 illustrates an example of a user table;

FIG. 4 illustrates an example of a next-ID table;

FIG. 5 illustrates a group-ID table;

FIG. 6 illustrates an example of a data table;

FIG. 7 illustrates an example of an access table;

FIG. 8 illustrates an example of a binary table;

FIG. 40 illustrates an example of a product information table;

FIG. 41 illustrates an image table;

FIG. 42 illustrates an index management database;

DESCRIPTION OF THE PREFERRED EMBODIMENTS

Preferred embodiments of the present invention will now be described in detail with reference to the drawings.

(1) First Embodiment

Figure 1:
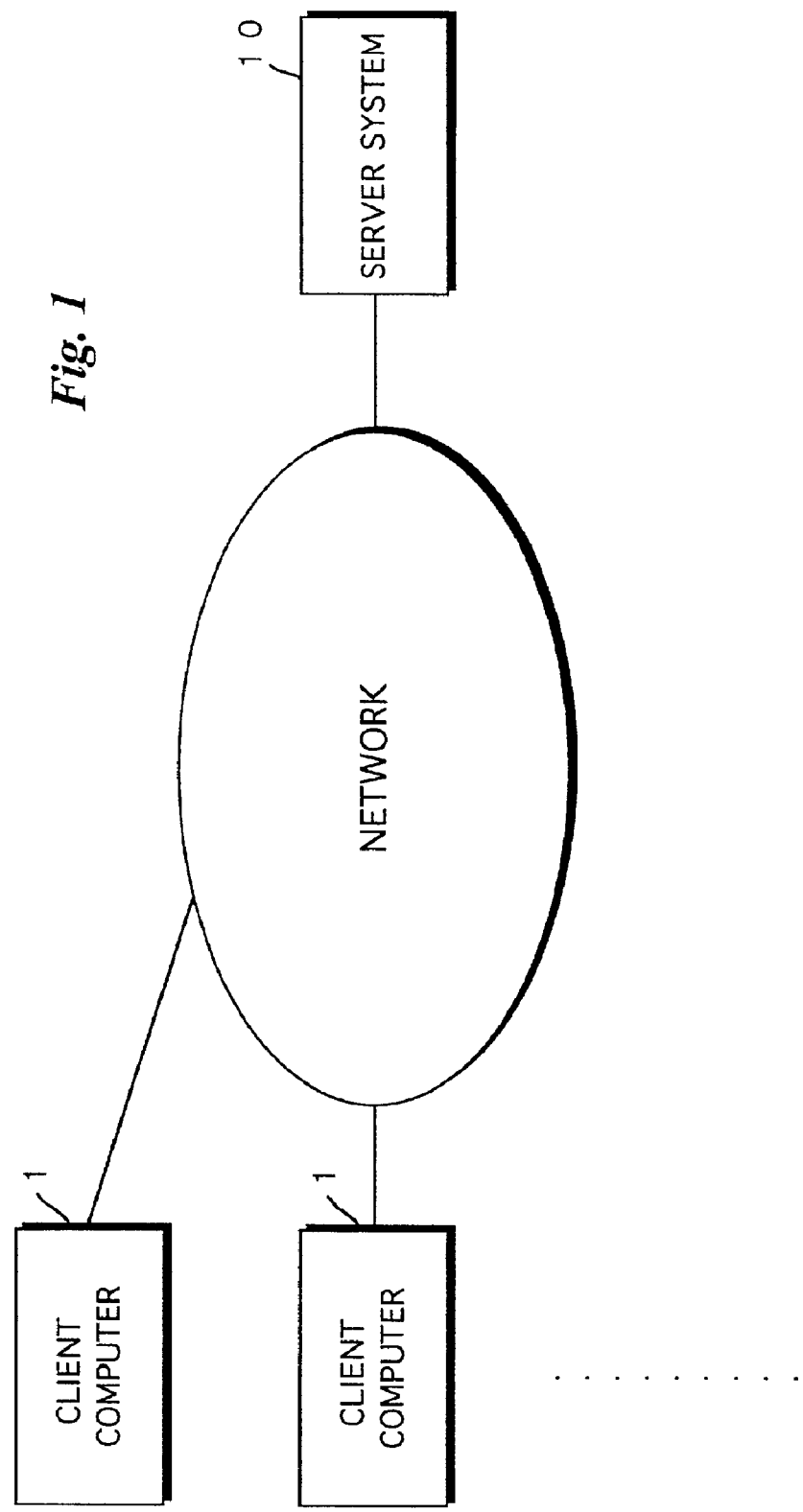
FIG. 1 is a diagram showing an overview of an image data communication system.

FIG. 1 shows an overview of an image data communication system according to a first embodiment of the present invention.

The image data communication system comprises client computers 1 and a server system 10. The client computers 1 and server system 10 are capable of communicating data with each other via a network such as the Internet.

In this image data communication system, original-image files (data) representing original images are transmitted from the client computers 1 to the server system 10.

The server system 10, besides storing a received original-image file temporarily, subjects an original-image file to a format conversion and generates a large-image file representing a large image. The server system 10 further generates a medium-image file, which is a file in which the quantity of data is less than that in the large-image file, and a thumbnail-image file in which the quantity of data is less than that in the medium-image file. The original-image file, large-image file, medium-image file and thumbnail-image file are included in one folder and stored in an image file unit 17, described later. The details of the image data communication system will become clear from the description that follows.

Figure 2:
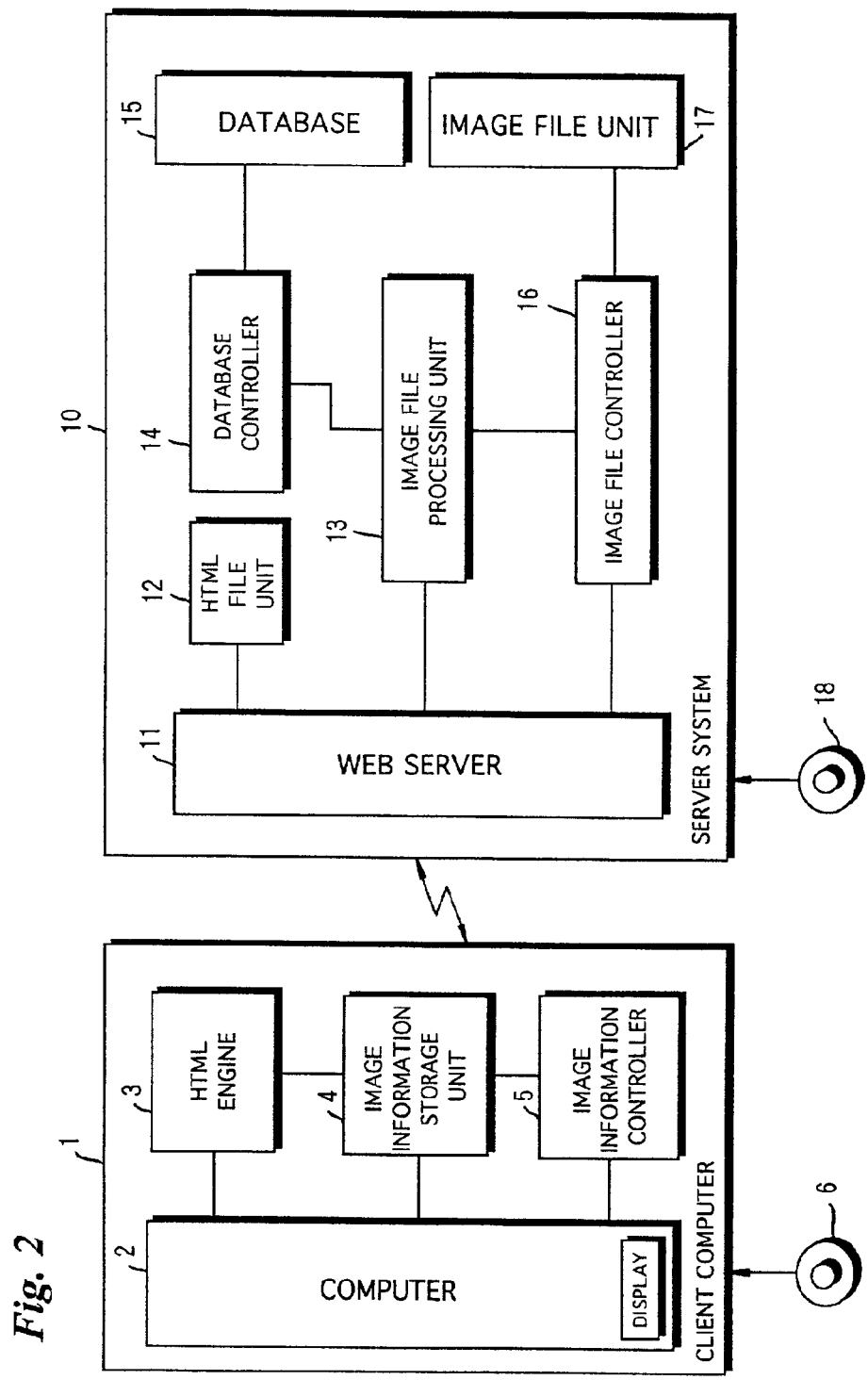
FIG. 2 is a block diagram showing the electrical structures of a client computer and server system in a first embodiment of the present invention.

FIG. 2 is a block diagram showing the electrical structure of each client computer 1 and the electrical structure of the server system 10. Though each of the circuits shown in FIG. 2 is illustrated as being implemented by hardware, some or all of the circuits can be implemented by software (utilizing a memory such as a hard disk as necessary). Software implementation is preferred over hardware implementation.

The client computer 1 includes a computer 2, which in turn includes a CPU, a memory, a CD-ROM (compact disk read-only memory) drive and a display unit, etc. An operating program is stored on a CD-ROM 6 so that the client computer 1 will execute processing in the manner described below. When the CD-ROM 6 is inserted into the client computer 1, the operating program is read by the computer 2.

The client computer 1 further includes an HTML engine 3 for displaying an image page, which is generated in HTML (HyperText Markup Language), on the display screen of the display unit of computer 2, an image information storage unit 4 for temporarily storing image information (inclusive of image files, attachment files and database registration information), and an image information controller 5 for transmitting image information, which has been stored temporarily in the image information storage unit 4, to the server system 10.

The server system 10 includes a Web server 11, which in turn includes a CPU, a memory, a CD-ROM drive and a display unit, etc. An operating program is stored on a CD-ROM 18 so that the server system 10 will execute processing in the manner described below. When the CD-ROM 8 is inserted into the client computer 10, the operating program is read by the Web server 11.

The server system 10 further includes an HTML file unit 12 in which data for displaying an image page based upon HTML is stored, a database 15 for storing various data, a database controller 14 for causing various data to be stored in the database 15, an image file unit 17 for storing image files, attachment files and the like transmitted from the client computer 1, an image file controller 16 for controlling the storage of image files, attachment files and the like in the image file unit 17, and an image file processing unit 13 for overall control of the operation of the server system 10.

FIGS. 3 to 8 are tables illustrating various data stored in the database 15 contained in the server system 10.

FIG. 3 is a user table. The user table stores information relating to the user who utilizes the image data communication system. The information in the user table is stored beforehand in the database 15 by the administrator of the server system 10.

Specifically, the table stores a user ID (User ID); a group number (Group ID) (the user constitutes a group composed of a plurality of users, and the group number is used to specify this group); a user name (User Name); a password (Password) for verifying that the user possesses the privilege to utilize the image data communication system; an indication (Entry OK) as to whether or not the user possesses the privilege to access a registration page displayed on the display unit of the client computer 1 when an original-image file is registered with the server system 10; an indication (Search OK) as to whether the user possesses the privilege to access a search page displayed on the display unit of the client computer 1 when image files that have been registered with the server system 10 are searched; an indication (Result OK) as to whether the user possesses the privilege to access a list-display page of search results; an indication (Detail OK) as to whether the user possesses the privilege to access a page indicating information more detailed than information found as the result of a search; and data representing whether the user possesses the privilege (binary-access privilege "Binary OK") to access an original image and a file attached to an original-image file.

FIG. 4 is a next-ID table. The next-ID table stores data relating to record numbers used to specify folders containing original-image files, large-image files, medium-image files and thumbnail-image files that have been stored in the image file unit 17 of the server system 10.

Specifically, the current record number (Current ID), which specifies the folder that was stored in the image file unit 17 last, and the next record number (Next ID), are stored in the next-ID table. This table is reset at initialization of the server system 10.

FIG. 5 is a group-ID table, which stores the group number (Group ID) and the group name (Group Name). Data that is stored in the group-ID table also is registered beforehand by the administrator of the server system 10.

FIG. 6 is a data table, which stores data relating to keywords entered when images are registered, as will be described later.

Stored in the data table are a record number, the ID (owner ID) of the user (owner) that registered an image, the number (Num of Binary) of attachment files, and keywords (Image Info) (four keywords are indicated in FIG. 6).

FIG. 7 is an access table. This table stores data indicating the privilege to access an image that has been stored in an image file.

Besides the record number, group numbers (Access ID0–Access ID4) indicating a group number of privilege 0 to a group number of privilege 4 have been stored in the access table. A group number of privilege 0 indicates the number of a group that is denied access to all images, namely thumbnail, medium, large and original images. A group number of privilege 1 indicates the number of a group that is allowed to access a thumbnail image but is denied access to medium, large and original images. A group number of privilege 2 indicates the number of a group that is allowed to access thumbnail and medium images but is denied access to large and original images. A group number of privilege 3 indicates the number of a group that is allowed to access thumbnail, medium and large images but is denied access to an original image. A group number of privilege 4 indicates the number of a group that is allowed to access to all images, namely thumbnail, medium, large and original images.

FIG. 8 is a binary table. This table stores data regarding original-image data and an attachment file. These items of data are stored in the binary table when an image is registered.

Stored in the binary table are a record number, the user ID of the owner, the binary file number (Binary Num), the file name (File Name) of the binary file and the byte size (Byte Size) of the binary file.

Figure 9:
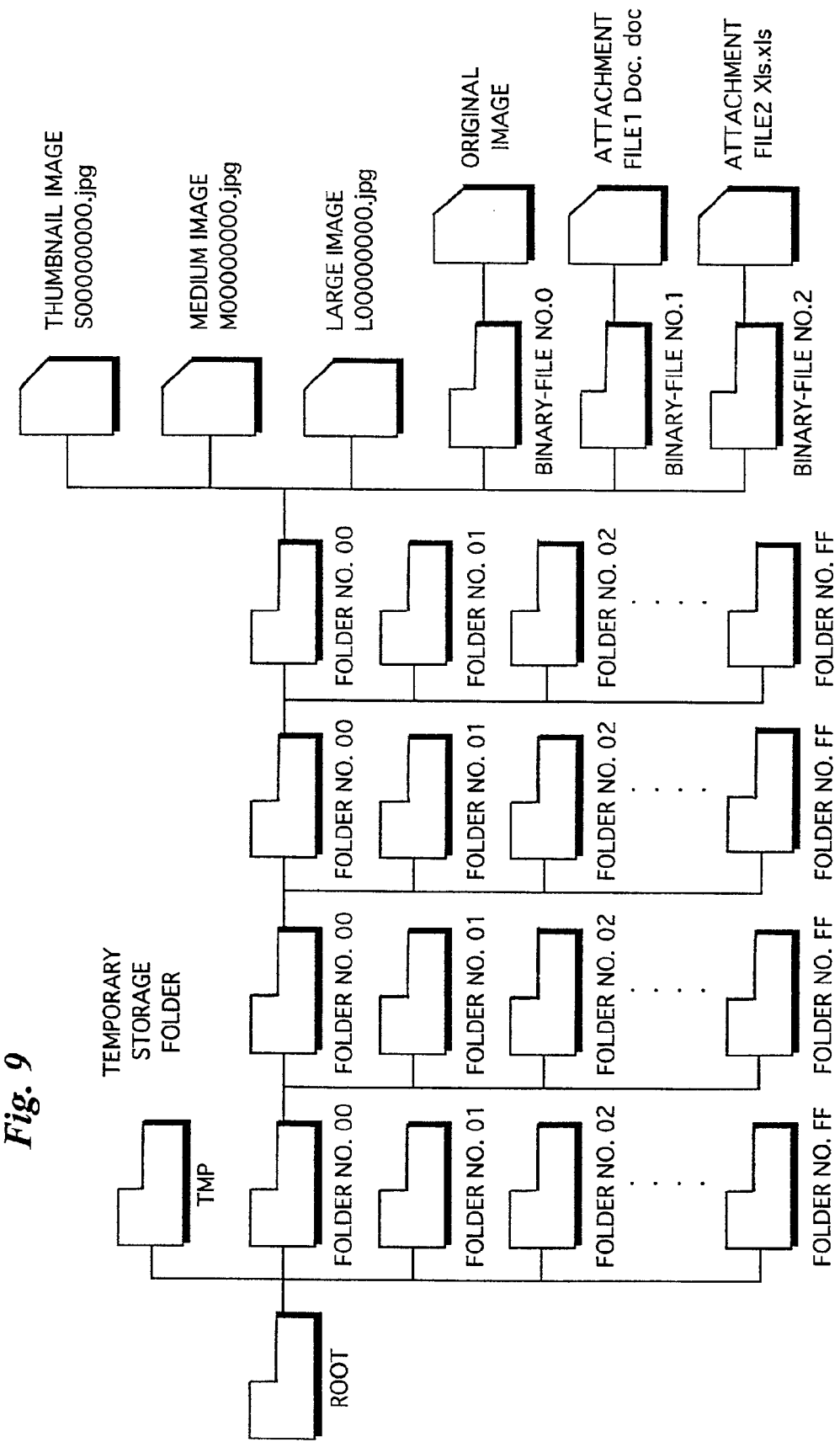
FIG. 9 illustrates the organization of folders stored in an image file unit.

FIG. 9 illustrates the organization of folders stored in the image file unit 17 of the server system 10.

A first layer of image folders is stored in a root folder ROOT. A temporary storage folder TMP and image folders of folder numbers "00" to "FF" are included in the first layer of image folders. A second layer of image folders is stored in each of the image folders of the first layer of folder numbers "00" to "FF". Image folders of folder numbers "00" to "FF" are included in the second layer of image folders. A third layer of image folders of folder numbers "00" to "FF" is stored in each of the image folders of the second layer of image folders. A fourth layer of image folders of folder numbers "00" to "FF" is stored in each of the image folders of folder numbers "00" to "FF" of the third layer.

A thumbnail-image file, medium-image file, large-image file, original-image file and attachment files are stored in the image folders of the fourth layer. A binary file number is assigned to the original-image file and to each attachment file.

These image folders are generated anew when thumbnail-image files, medium-image files and large-image files are generated and the generated thumbnail-image files, medium-image files and large-image files, along with the original-image files and attachment files, are stored in the image file unit 17.

An assemblage of the folder numbers of the first to fourth layers corresponds to a record number. The record number serves as a path to an image folder in which a thumbnail-image file, medium-image file, large-image file, original-image file and attachment files have been stored. For example, if the record number is "0000F823", an image folder in which a thumbnail-image file, medium-image file, large-image file, original-image file and attachment files have been stored is specified by the path "ΨROOTΨ00Ψ00ΨF8Ψ23".

Figure 10:
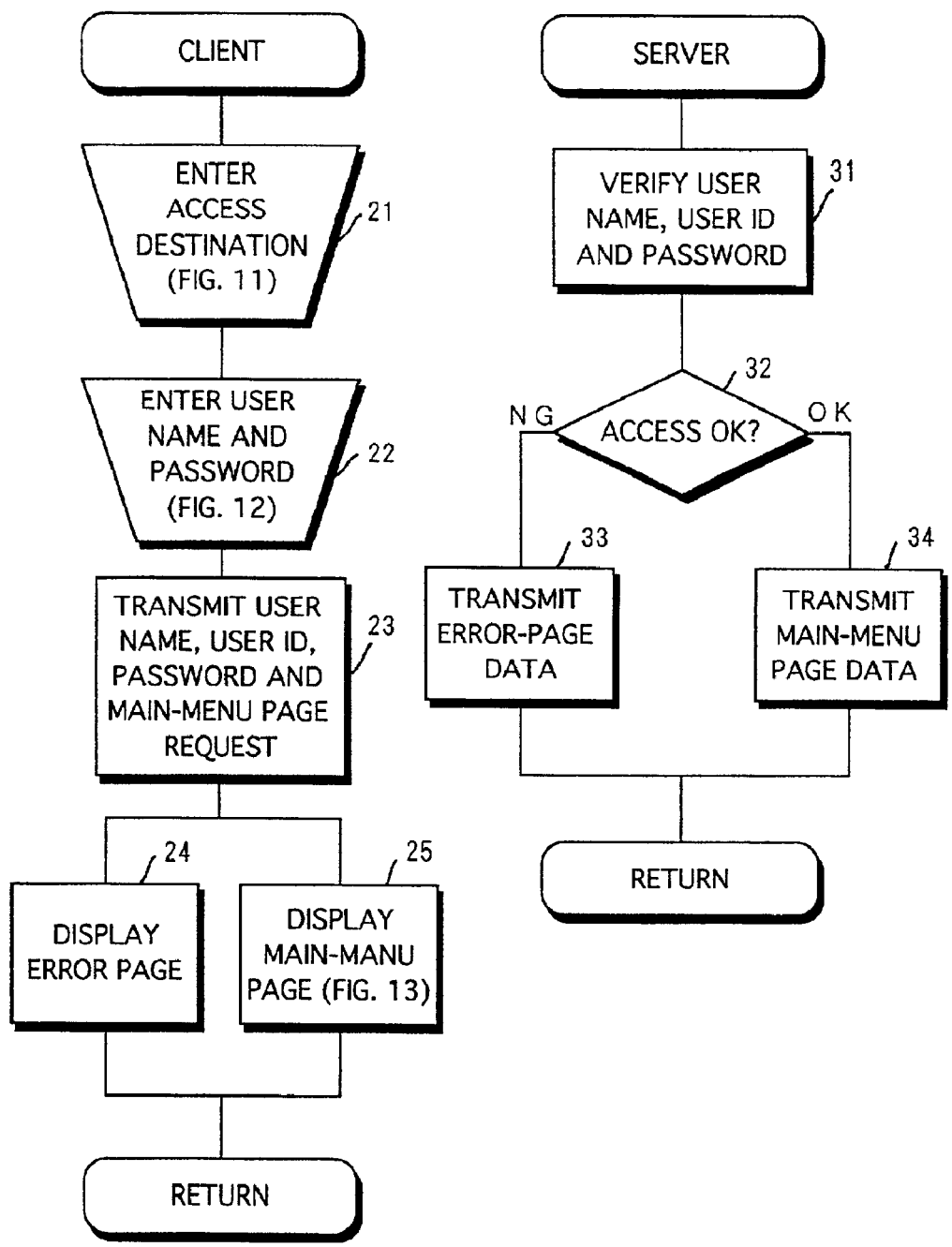
FIG. 10 shows flowcharts illustrating processing procedures of the client computer and server system.
Figure 11:
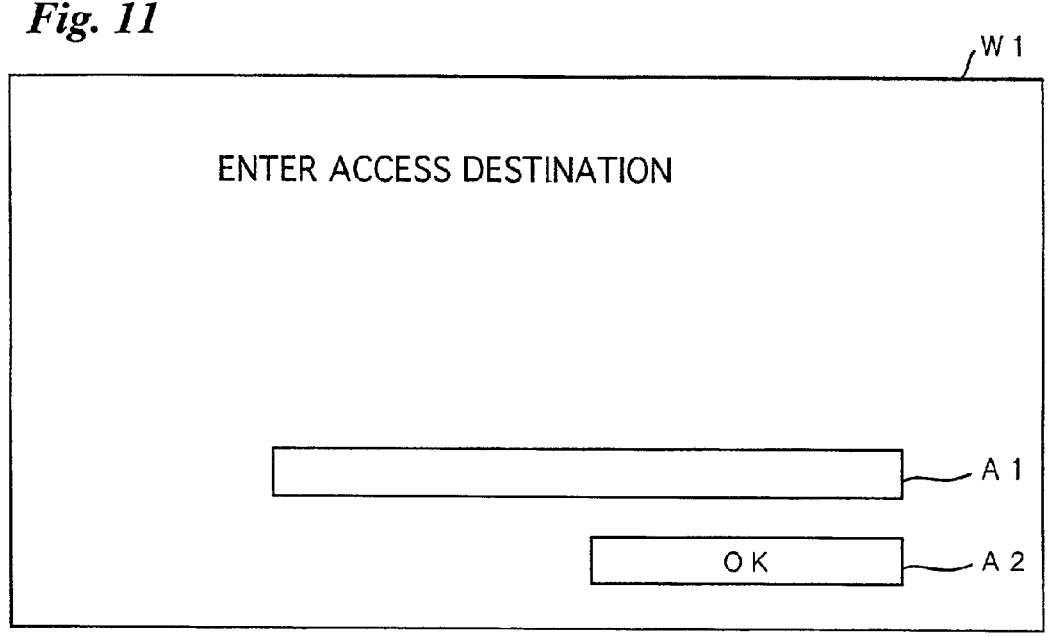
FIGS. 11 to 13 illustrate examples of windows displayed on a display unit of the client computer.
Figure 12:
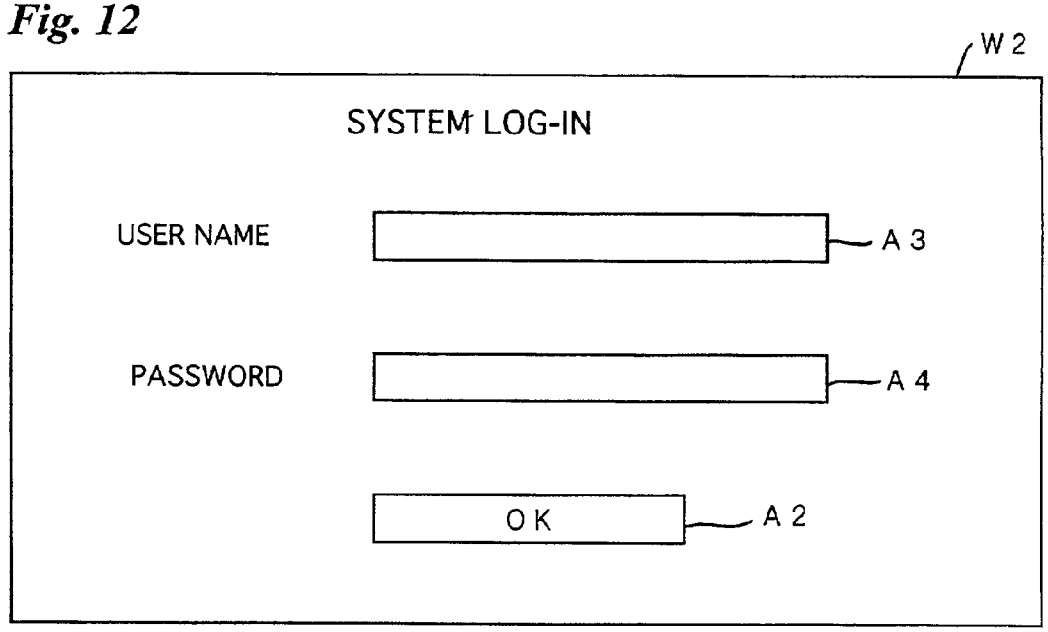
Figure 13:
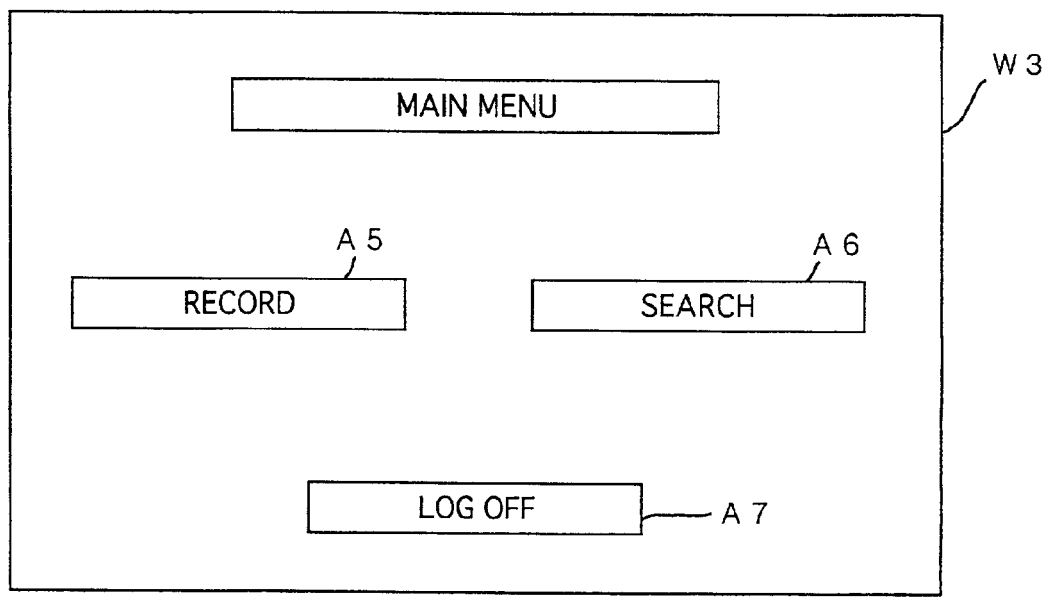

FIG. 10 shows flowcharts illustrating processing procedures of the client computer 1 and server system 10. These flowcharts show processing executed when a main-menu page is displayed on the display unit of the computer 2 of client computer 1. FIGS. 11 to 13 illustrate examples of windows displayed on the display unit of the computer 2 of client computer 1.

When the computer 2 of the client computer 1 is booted up, an access-destination input window W1 shown in FIG. 11 is displayed on the display unit of the computer 2 (step 21). The window W1 includes an access-destination input field A1. The user of the client computer 1 inputs the address of the server system 10, which is the access destination, using the keyboard of the computer 2. As a result, the entered access destination is displayed in the field A1. If the access destination displayed in the field A1 is not erroneous, the user of the client computer 1 clicks an "OK" area A2.

A log-in request is transmitted from the HTML engine 3 to the server system 10 that the user is attempting to access.

If the server system 10 receives the log-in request from the client computer 1, log-in page data is read out of the HTML file unit 12 by the Web server 11. The log-in page data that has been read is transmitted from the server system 10 to the image information storage unit 4 of the client computer 1 by the Web server 11 and is stored in the image information storage unit 4 temporarily. By reading the log-in page data out of the image information storage unit 4 and applying it to the computer 2, a window W2 of the log-in page shown in FIG. 12 is displayed on the display unit of the computer 2.

The log-in page window W2 includes a user-name field A3, a password field A4 and an "OK" area A2. Using the keyboard of the computer 2, the user of the client computer 1 enters his or her own name, whereby the entered name is displayed in the user-name field A3. Further, using the keyboard of the computer 2, the user enters a password, in response to which asterisks are displayed in the field A4 (step 22). The password is for verifying whether the user possesses the privilege to utilize the image data communication system. A user having the privilege knows the password in advance. When the entry of the user name and password has been completed, the user of the client computer 1 clicks the "OK" area A2.

User IDs have been stored in association with user names in the memory of the computer 2. When the "OK" area A2 is clicked, the user ID is read out of the memory of computer 2. The user ID that has been read and the data representing the user name and password that have been entered are stored in the image information storage unit 4 temporarily. The items of data indicating the user ID, the user name, the password and the main-menu page request are transmitted to the server system 10 (step 23).

The items of data indicating the user ID, the user name, the password and the main-menu page request transmitted from the client computer 1 are input to the image file processing unit 13 of the server system 10. The database controller 14 is controlled by the image file processing unit 13. The database 15 is searched by the database controller 14 and a user table which corresponds to the user who requested the main-menu page is found among the user tables (see FIG. 3) that have been stored in the database 15.

Reference is had to the found user table to verify the user name, the user ID and password (step 31). If the result of verification is that the user has the privilege to utilize the image data communication system ("OK" at step 32), then, under the control of the image file processing unit 13, the main-menu page data is read out of the HTML file unit 12 and is then transmitted to the client computer 1 by the Web server 11 (step 34). If the user has the utilization privilege, the group number indicating the group to which the user belongs is also read out of the user table and then transmitted to the client computer 1. If the result of verification is that the user does not have the privilege to utilize the image data communication system ("NG" at step 32), then, under the control of the image file processing unit 13, error-page data is read out of the HTML file unit 12 and is then transmitted to the client computer 1 by the Web server 11 (step 33).

When the main-menu page data is received, a window W3 indicating the main menu is displayed on the display unit of the computer 2, as shown in FIG. 13, at the client computer 1 (step 25). The main-menu window W3 includes a registration area A5, a search area A6 and a log-off area A7. Clicking the registration area A5 results in a transition to image registration processing (described later), and clicking the area A6 results in a transition to image search processing (described later). The client computer 1 logs off in response to clicking of the log-off area A7.

When the error-page data is received, a window indicating an error is displayed on the display unit of 11 the computer 2 at the client computer 1. By observing the error window, the user of the client computer 1 ascertains that an error has occurred such as entry of an erroneous user name or password. If necessary, the user tries accessing the server system 10 again.

Figure 14:
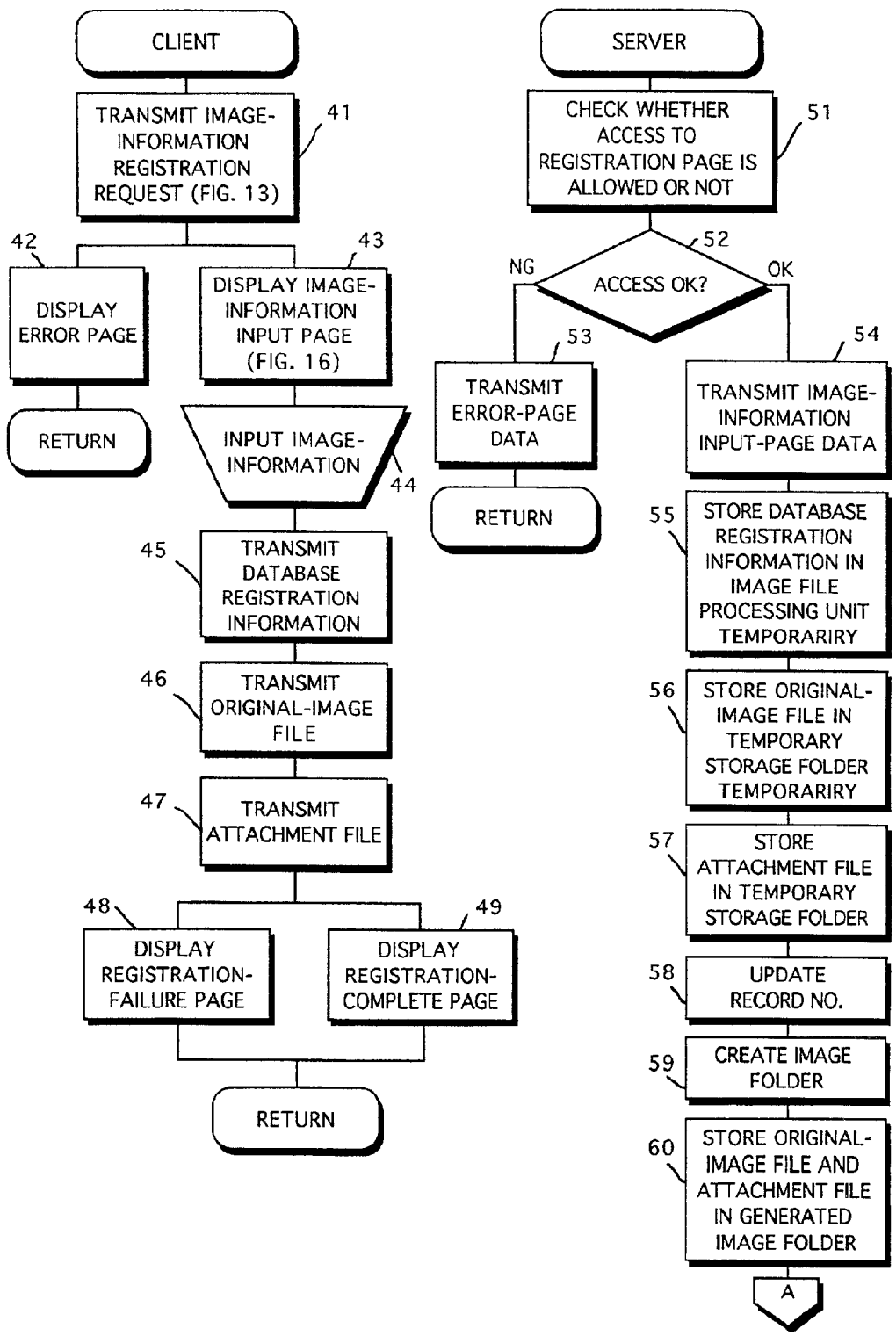
FIGS. 14 and 15 are flowcharts illustrating processing procedures of the client computer and server system.
Figure 15:
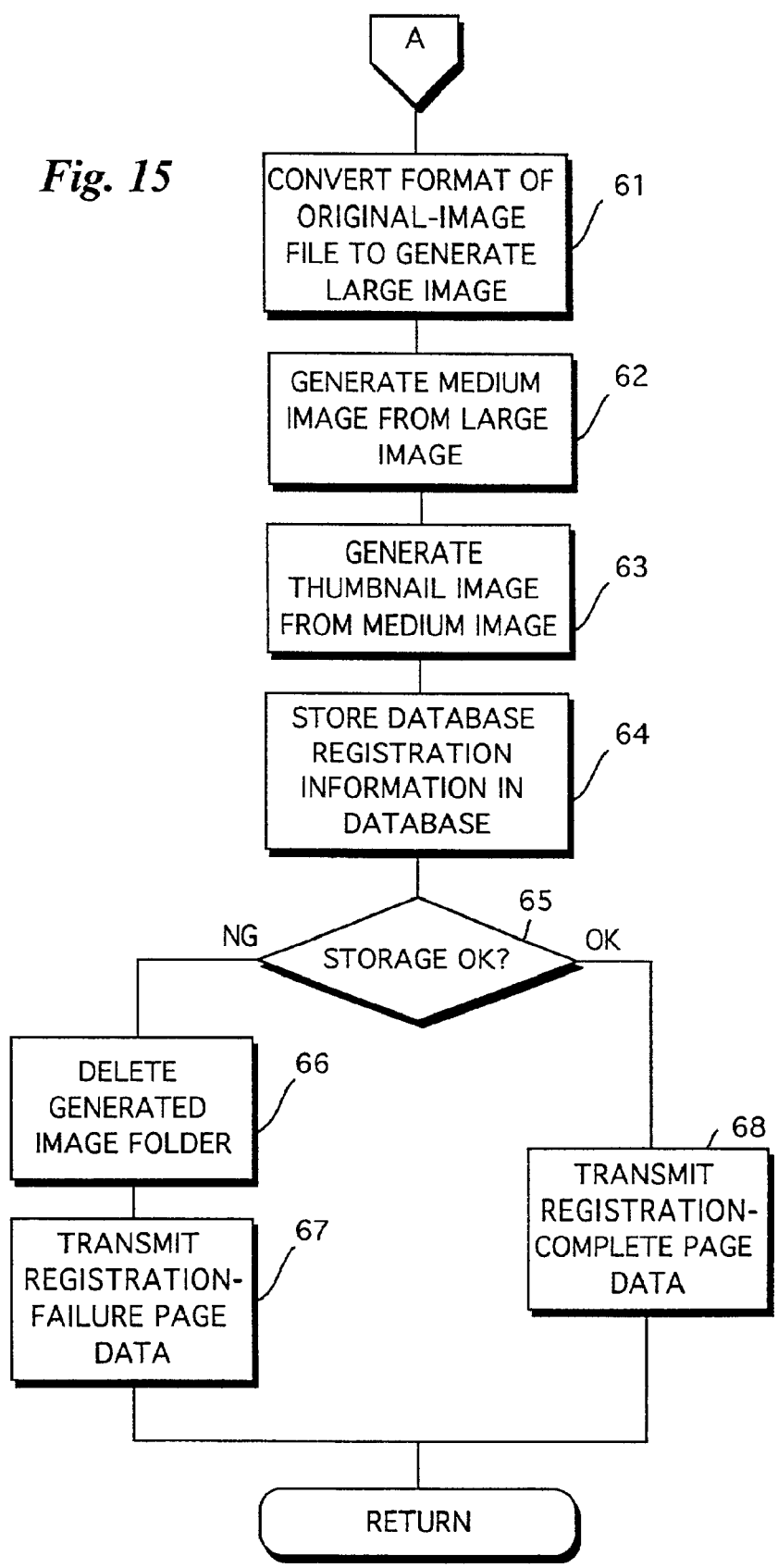
Figure 16:
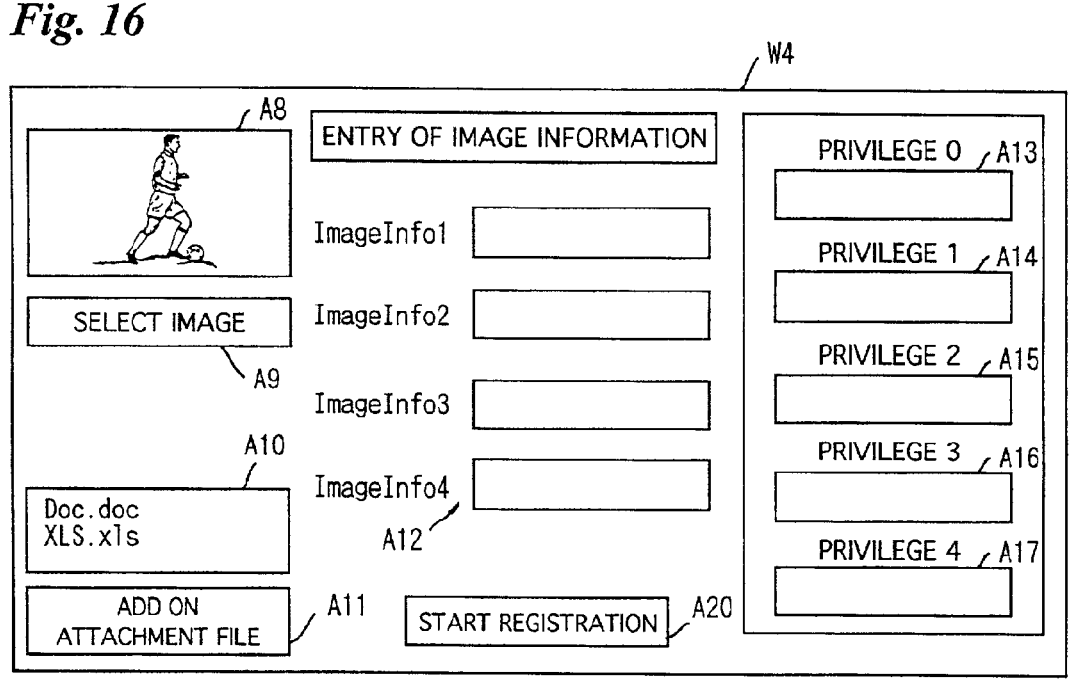
FIG. 16 illustrates an example of a window displayed on the display unit of the client computer.
Figure 17:
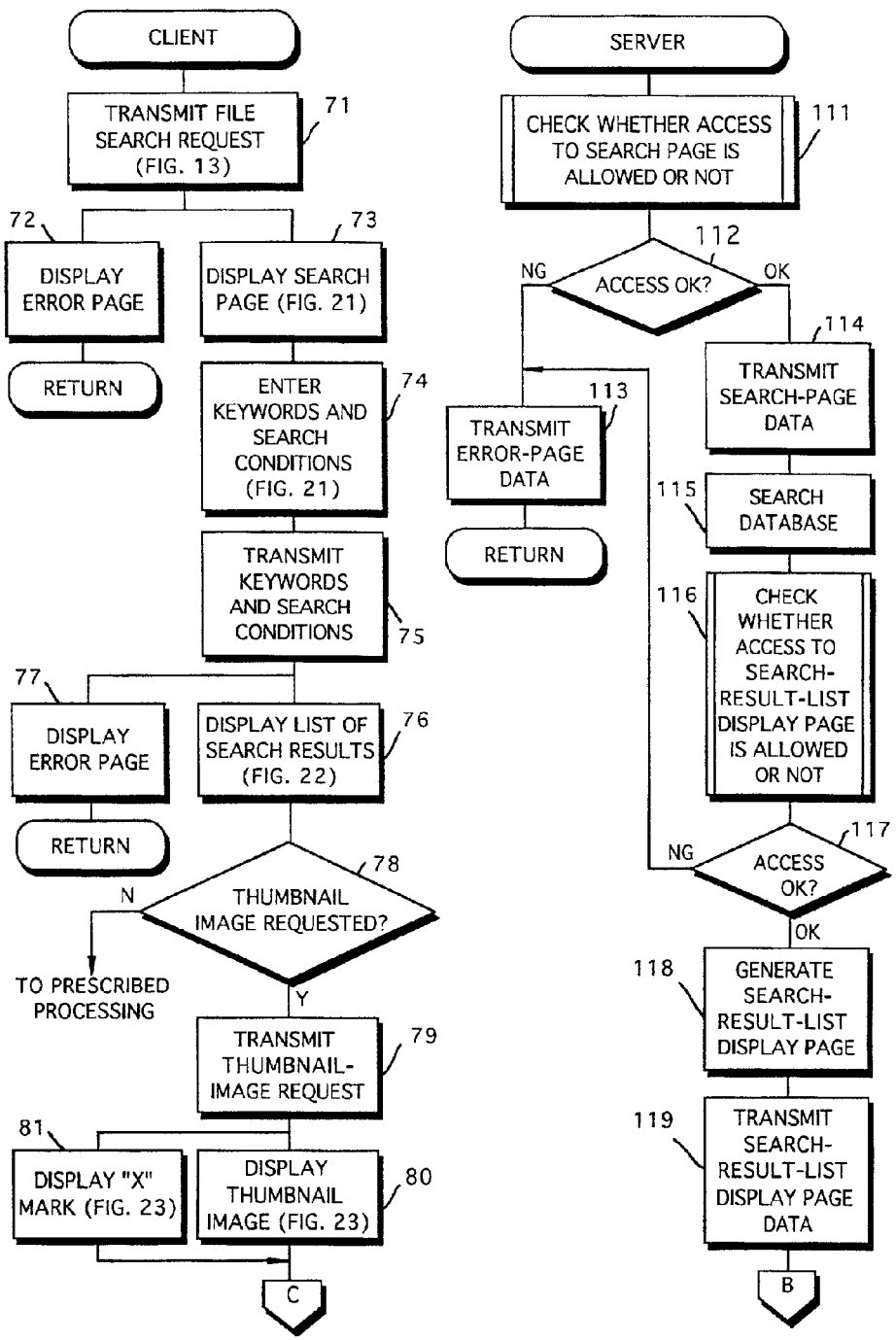
FIGS. 17 to 20 are flowcharts illustrating processing procedures of the client computer and server system.
Figure 18:
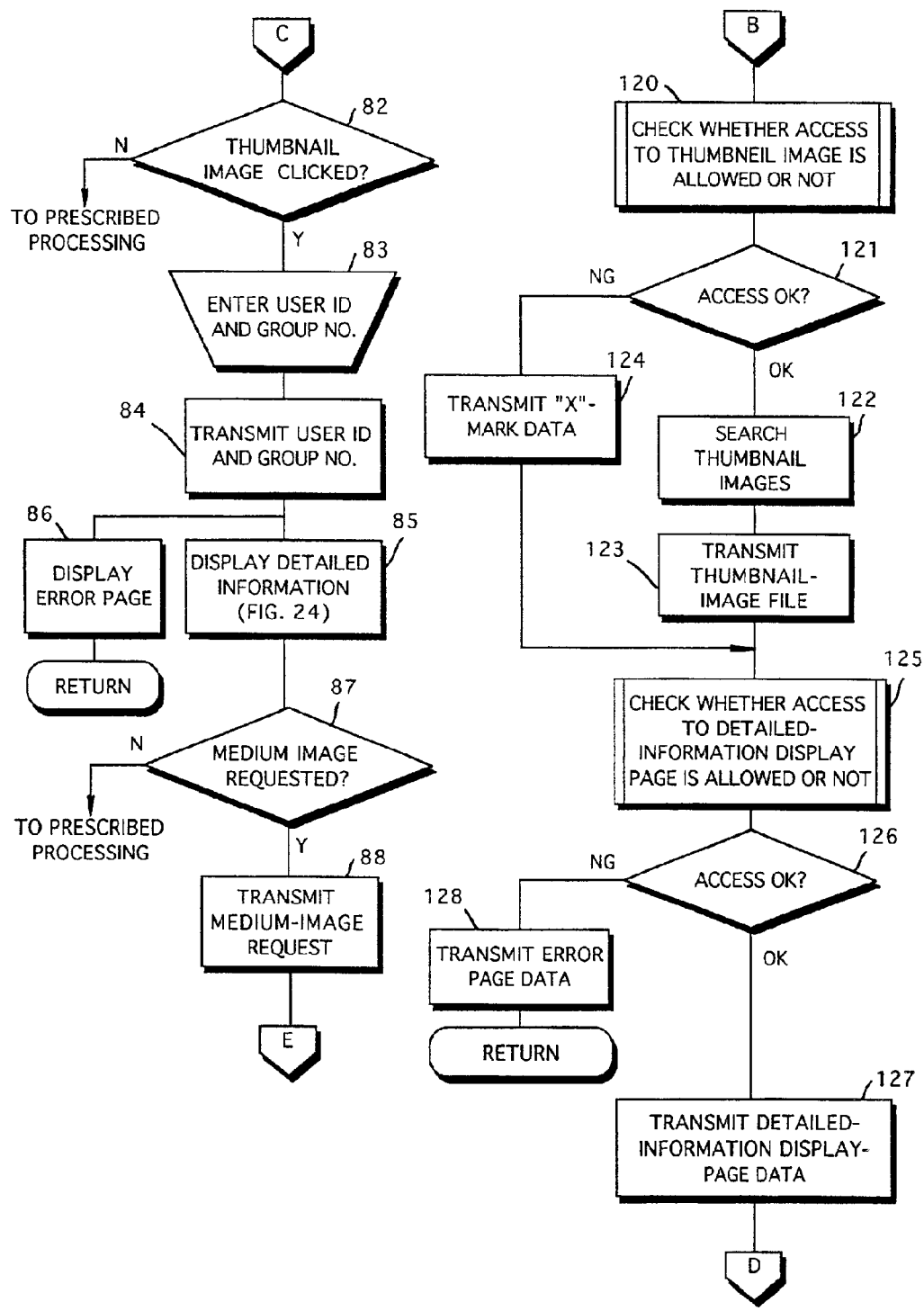
Figure 19:
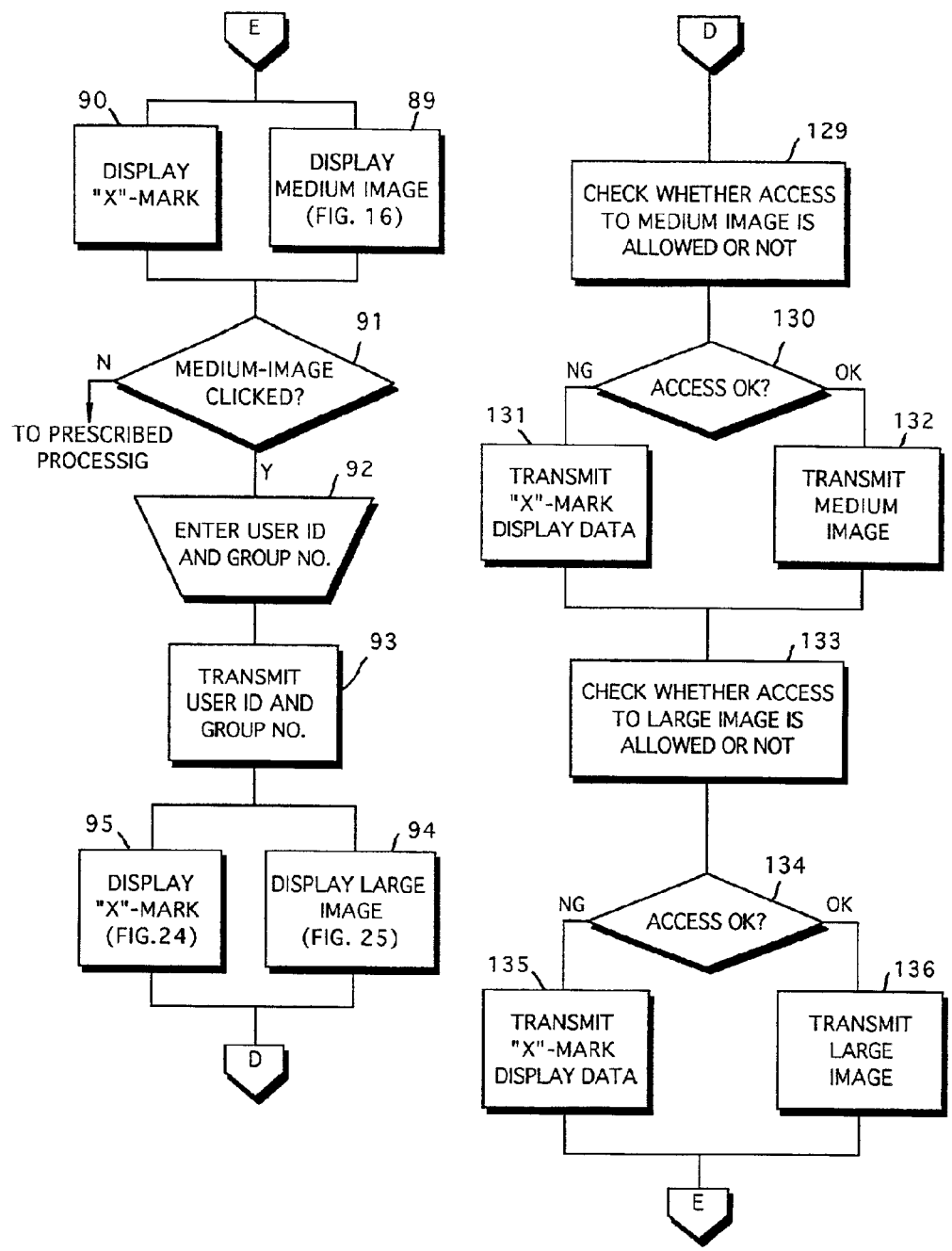
Figure 20:
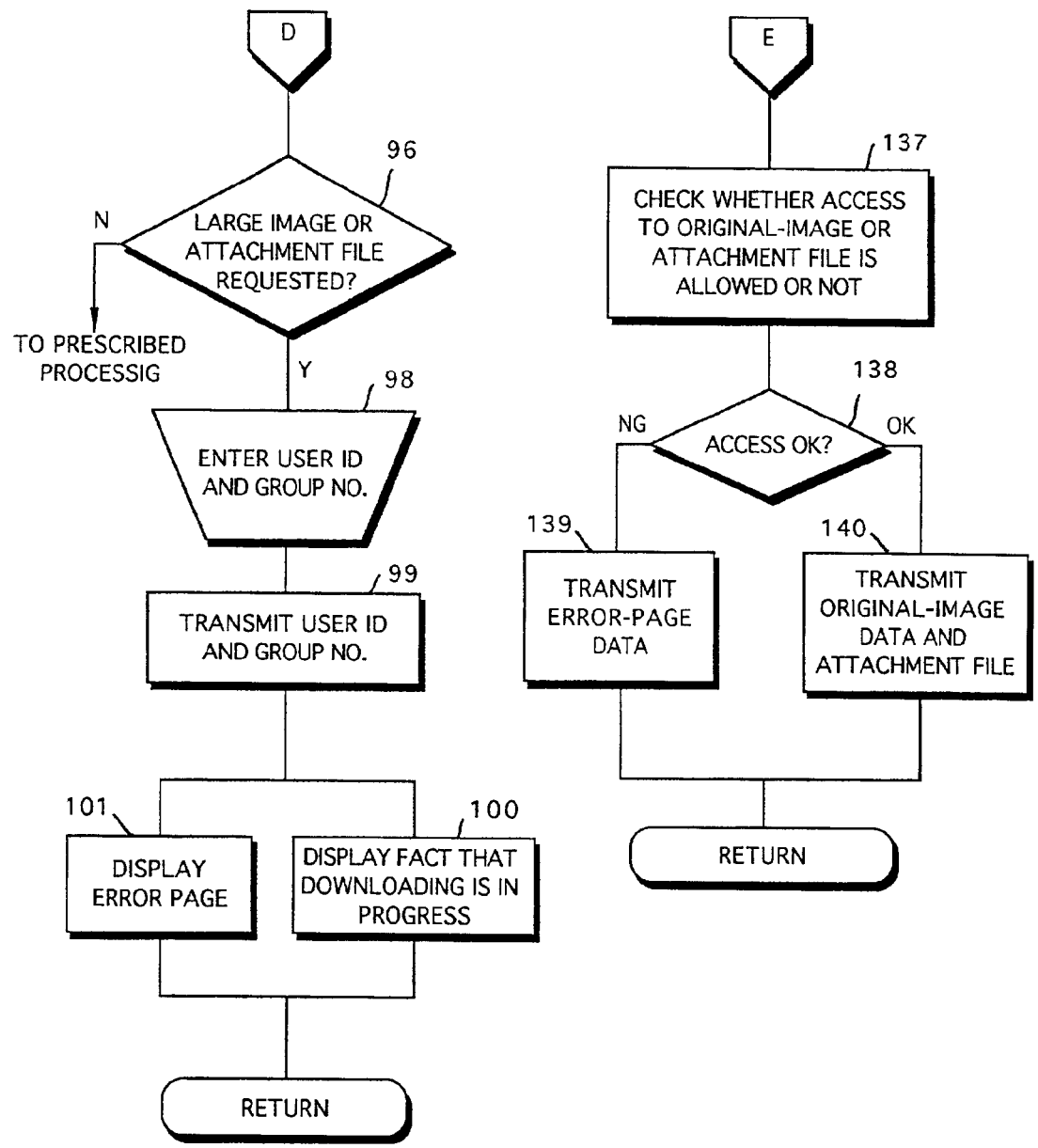

FIGS. 14 and 15 are flowcharts illustrating processing procedures of the client computer 1 and server system 10. These flowcharts show the procedure of processing for registering image information. FIG. 16 illustrates an example of a window displayed on the display unit of the client computer 1.

Processing for registering image information is started by clicking the registration area A5 in the main-menu window W3 shown in FIG. 13.

When the registration area A5 is clicked by the user of the client computer 1, the user ID and data representing an image-information registration request are transmitted from the image information storage unit 4 to the server system 10 (steps 40 and 41).

When the user ID and data representing the image-information registration request are received at the server system 10, the user table having this user ID is searched for in the database 15. If the user table is found, the absence or presence of the privilege to access the registration page stored in the user table is checked (step 51). If it is found that the user who issued the image-information registration request possesses the access privilege ("OK" at step 52), image-information input-page data is read out of the HTML file unit 12 of server system 10 and transmitted to the client computer 1 (step 54). If it is found that the user who issued the image-information registration request does not possess the access privilege ("NG" at step 52), then error-page data is read out of the HTML file unit 12 of server system 10 and transmitted to the client computer 1 (step 53).

If the image-information input page is received at the client computer 1, an image-information input page window W4 shown in FIG. 16 is displayed on the display unit of the client computer 1 (step 43). The user of the client computer 1 inputs the image information using the image-information input page window W4 (step 44).

The image-information input page window W4 includes the following areas and fields:

Image display area A8: This is an area which displays an image represented by an original-image file transmitted from the client computer 1 to the server system 10.

Image selection area A9: This is an area clicked by the user of the client computer 1 when an original-image file to be transmitted from the client computer 1 to the server system 10 is selected. A new window for entering a file name is displayed by clicking the area A9. By entering a file name in this new window, the original-image file to be transmitted to the server system 10 is selected.

Attachment file name display area A10: This is an area which displays the file name of a file attached to an original-image file and transmitted to the server system.

Attachment file add-on area A11: This is an area clicked by the user of the client computer 1 when an attachment file is to be added on. A new window for entering an attachment file name is displayed by clicking the area A11. By entering an attachment file name in this new window, the attachment file to be transmitted is selected. The attachment file that has been selected is displayed in the attachment file name display area A10.

Keyword input area A12: This is an area for displaying keywords (one type of image search condition) used when an original-image file to be transmitted is searched. A keyword related to an image displayed by the original-image file is entered. In FIG. 16, a maximum of four keywords can be entered with regard to one image. Of course, an arrangement in which five or more keywords can be entered may be adopted.

Access privilege input fields A13–A16: These are areas for entering the names of groups that are capable of accessing images registered with the server system. According to this embodiment, access privileges of the five levels of 0 to 4 are available. Access privilege 0 denies access to all images, namely thumbnail, medium, large and original images, that have been registered with the server system 10. A group name given access privilege 0 is written in the field A13. Access privilege 1 allows access to a thumbnail image but denies access to medium, large and original images. A group name given access privilege 1 is written in the field A14. Access privilege 2 allows access to thumbnail and medium images but denies access to large and original images. A group name given access privilege 2 is written in the field A15. Access privilege 3 allows access to thumbnail, medium and large images but denies access to an original image. A group name given access privilege 3 is written in the field A16. Access privilege 4 allows access to all images, namely thumbnail, medium, large and original images. A group name given access privilege 4 is written in the field A17.

Registration start area A20: This is an area clicked by the user of the client computer 1 when registration of image information with the server system 10 is to start.

The user of the client computer 1 enters image information [original-image file, attachment file and database registration information (keywords and access privileges shall be referred to as "database registration information")] in the respective areas and fields of the image-information input page window W4 (step 44). The database registration information in the entered image information is stored temporarily in the image information storage unit 4.

A database-information transmission request is issued to the image information storage unit 4 from the HTML engine 3 and database registration information is read out of the image information storage unit 4. The database registration information that has been read out is transmitted from the client computer 1 to the server system 10 (step 45).

The database registration information transmitted from the client computer 1 is applied to the image file processing unit 13 of server system 10, where the information is stored temporarily (step 55). When this is done, a request for transmission of an original-image file is transmitted from the image file processing unit 13 to the client computer 1.

In response to the request for transmission of the original-image file, the original-image file is read out of the computer 1 and is then transmitted to the server system 10 by the image information controller 5 (step 46).

When the original-image file is received by the server system 10, the file is stored in the temporary storage folder of the image file unit 17 by the image file controller 16 (step 56). The image file controller 16 provides the client computer 1 with notification of completion of reception. The image file processing unit 13 provides the client computer 1 with a request for transmission of an attachment file.

The attachment file is read out of the computer 2 and stored temporarily by the image information controller 5. The attachment file stored is read out and transmitted from the client computer 1 to the server system 10 (step 47).

After the attachment file transmitted from the client computer 1 is stored temporarily in the image file controller 16, it is stored in the temporary storage folder of the image file unit 17 (step 57). When the attachment file is stored in the temporary storage folder, the image file controller 16 sends the client computer 1 notification of completion.

The next-ID table that has been stored in the database 15 is then searched by the database controller 14 and the next record number is read out. The current record number is updated to the next record number (step 58). When the record number is updated to the next record number, a new image storage folder having the updated record number as a path is generated (step 59). The original-image file and attachment file stored temporarily in the temporary storage folder are stored in the image storage folder that has been generated (step 60).

The original-image file that has been stored in the image storage folder is read out and, in order that an image can be displayed on the display unit of the computer 2 of client computer 1, the file is subjected to a format conversion and a large-image file is generated by the image file controller 16 (step 61). By way of example, a large-image file in accordance with the JPEG (joint photographic coding experts group) standard is generated from a bitmap original-image file by the format conversion. If the original-image file is already a file having a format that is the result of a format conversion, then a format conversion is not carried out. In such case the original-image file and the large-image file are the same. When the formats of the original-image file and large-image file are identical, both of the files may be stored in the image storage folder or only the original-image file may be stored in the image storage folder.

A subsampling rate is decided in the image file controller 16 based upon the large-image file that has been generated. Subsampling processing is executed by the image file controller 16 using the subsampling rate that has been decided. An medium-image file having a data quantity less than that of the original-image file is generated by subsampling processing (step 62).

Subsampling of the generated medium-image file is performed by the image file controller 16 to generate a thumbnail-image file (step 63). The generated large-image file, medium-image file and thumbnail-image file are stored in the image storage folder as that of the original-image file and attachment file. The fact that these files have been stored is transmitted from the image file controller 16 of the server system 10 to the client computer 1. Though the large-image file, medium-image file and thumbnail-image file have the same format, they need not necessarily have the same format. Further, though the medium-image file and thumbnail-image file are generated by subsampling the large-image file, an medium-image file the quantity of data of which is less than that of the original-image file and a thumbnail-image file the quantity of data of which is less than that of the medium-image file may be generated without necessarily executing subsampling. For example, the medium-image file and thumbnail-image file can be generated by subjecting the original-image file (large-image file) to partial segmentation, color-reduction processing, compression processing and a format conversion, etc.

The image file processing unit 13 of the server system 10 provides the database controller 14 with a request for storage of database registration information. The database registration information is stored in the database 15 by the database controller 14 (step 64). More specifically, a new data table (see FIG. 6), access table (see FIG. 7) and binary table (see FIG. 8) are generated for each record number and stored in the database 15.

When all of the database registration information is stored in the database 15 ("OK" at step 65), registration-complete page data is read out of the HTML file unit 12 by the Web server 11 and the data is transmitted to the client computer 1 (step 68). If storage of the database registration information in the database 15 fails ("NG" at step 65), the image storage file that was newly generated in the image file unit 17 is deleted (step 66). It goes without saying that the updated record number also is restored to the original number. Registration-failure page data is read out of the HTML file unit 12 and transmitted to the client computer 1 (step 67).

When the registration-complete page data is received at the client computer 1 (step 49), a window indicating the completion of registration is displayed on the display unit of the computer 2. By observing the window indicative of completion of registration, the user of the client computer 1 is capable of confirming that an image file has been registered with the server system 10 without failure. Since an original-image file, large-image file, medium-image file and thumbnail-image file have already been stored in the server system 10, the user of the client computer 1 that registered the image file is capable of accessing the desired image file by accessing the server system 10 using the client computer 1. Furthermore, a user other than the user of the client computer 1 that registered the image file can, in dependence upon the access privilege of this user, access the original-image file, large-image file, medium-image file or thumbnail-image file.

The original-image file itself is stored in the Web server 11. This image file represents the image having the highest image quality. Printing of an image having a very high image quality is possible at the server system 10.

If error-page data is received at the client computer 1, an error page is displayed on the display unit of the computer 2 (step 42). If registration-failure page data is received by the client computer 1, a registration-failure page is displayed on the display unit of the computer 2 (step 48). In either case, the user of the client computer 1 becomes aware of the fact that an image file failed to be registered with the server system 10. If necessary, the user of the client computer 1 executes processing again to register the image information.

FIGS. 17 to 20 are flowcharts illustrating processing for searching image files, and FIGS. 21 to 28 illustrate examples of windows displayed on the display unit of the computer 2 of client computer 1.

When the main-menu page (see FIG. 13) is being displayed on the display unit of the computer 2 of the client computer 1, the search area A6 is clicked by the user of the client computer 1, whereby a transition is made to image file search processing.

When the search area A6 on the main-menu page is clicked, the user ID and data indicating a request for a file search page are transmitted from the image information storage unit 4 to the server system 10 (step 71).

The user ID and the data indicating the request for the file search page are input to the image file processing unit 13 of the server system 10, whereupon the database controller 14 is controlled to search the user tables, which have been stored in the database 15, for a user table having the user ID transmitted from the client computer 1. If the corresponding user table is found, the absence or presence of the privilege to access the search page stored in this user table is checked to confirm whether access to the search page is allowed or not (step 111).

If the client computer 1 has the privilege to access the search page ("OK" at step 112), search-page data is read out of the HTML file unit 12 and the data is then transmitted to the client computer 1 by the Web server 11 (step 114). If the client computer 1 does not possess the privilege to access the search page ("NG" at step 112), error-page data is read out of the HTML file unit 12 and is then transmitted to the client computer 1 by the Web server 11 (step 113).

When the error-page data is received, the HTML engine 3 of the client computer 1 displays an error page on the display unit of the computer 2 (step 72). By observing the error page, the user of the client computer 1 ascertains that the client computer 1 does not possess the search privilege.

Figure 21:
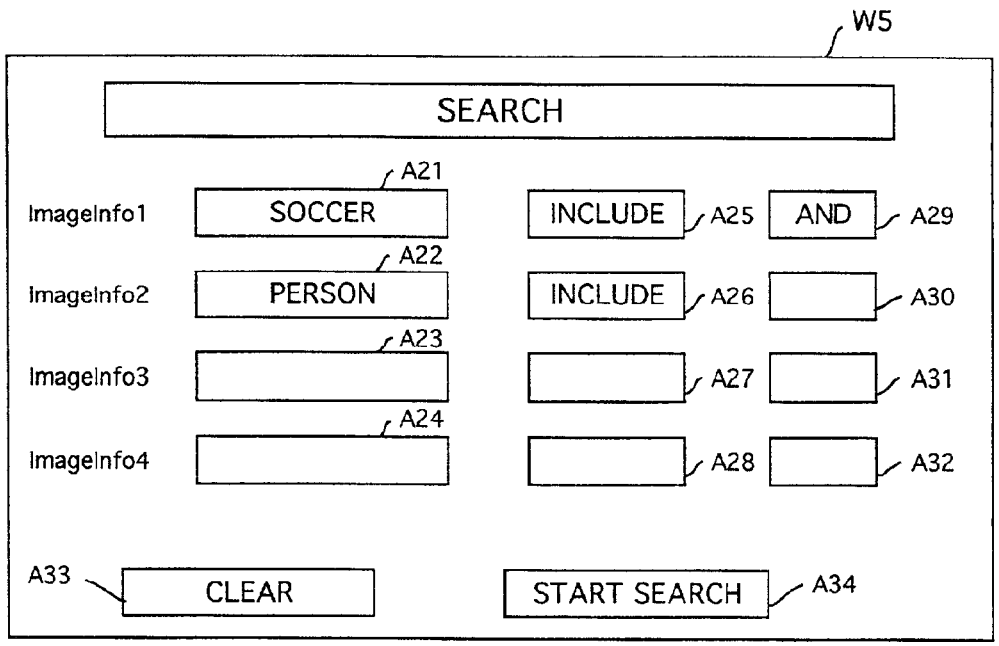
FIGS. 21 to 28 illustrate examples of windows displayed on the display unit of the client computer.

When the search-page data is received, the HTML engine 3 of the client computer 1 displays a search page of the kind shown in FIG. 21 on the display unit of the computer 2 (step 73). The search page includes the following areas and fields:

Keyword display fields A21–A24: These are fields for displaying keywords entered by the user. Using the keyboard of the computer 2, the user enters keywords which the user believes are possessed by the image to be found.

First search condition display areas A25–A28: These are areas for specifying whether an image file that contains an entered keyword is to be searched or whether an image file that excludes an entered keyword is to be searched, and for displaying the search conditions that have been specified. The first search condition display areas A25–A28 are provided in association with the keyword display fields A21–A24, and the search conditions also are input in association with the respective keywords.

Second search condition display areas A29–A32: These are areas which, if a plurality of keywords have been entered, specify whether the plurality of keywords are to be searched under an AND condition or under an OR condition and display the search conditions that have been specified.

Clear area A33: This is an area clicked by the user of the client computer 1 when all entered keywords and search conditions are to be cleared.

Search start area A34: This is an area clicked by the user of the client computer 1 when registration of image information with the server system 10 is to start.

When the search page is displayed on the display unit of the computer 2, keywords and search conditions are entered in the respective areas (step 74). The entered keywords and search conditions are stored temporarily in the image information storage unit 4. Data representing the stored keywords and search conditions are read out of the image information storage unit 4 and transmitted to the server system 10 (step 75).

The data representing the keywords and search conditions is input to the image file processing unit 13, whereupon a user table having the user ID already transmitted from the client computer 1 is searched for in the database 15 by the database controller 14 (step 115). Reference is had to the user table found as the result of the search to determine whether the client computer 1 has the privilege to access a page displaying a list of search results (step 116).

If the client computer 1 does not possess the access privilege ("NG" at step 117), error-page data indicating that the client computer 1 does not have the privilege to access the search-result-list display page is transmitted from the HTML file unit 12 to the client computer 1 (step 113). If the client computer 1 possess the access privilege ("OK" at step 117), the data table having the given keyword is found from the database 15 and the image file processing unit 13 generates the page displaying the list of search results (step 118).

The generated data representing the search-result-list display page and the data representing the record number is transmitted from the Web server 11 of the server system 10 to the client computer 1 (step 119). The data representing the record number is stored in the image information storage unit 4.

Figure 22:
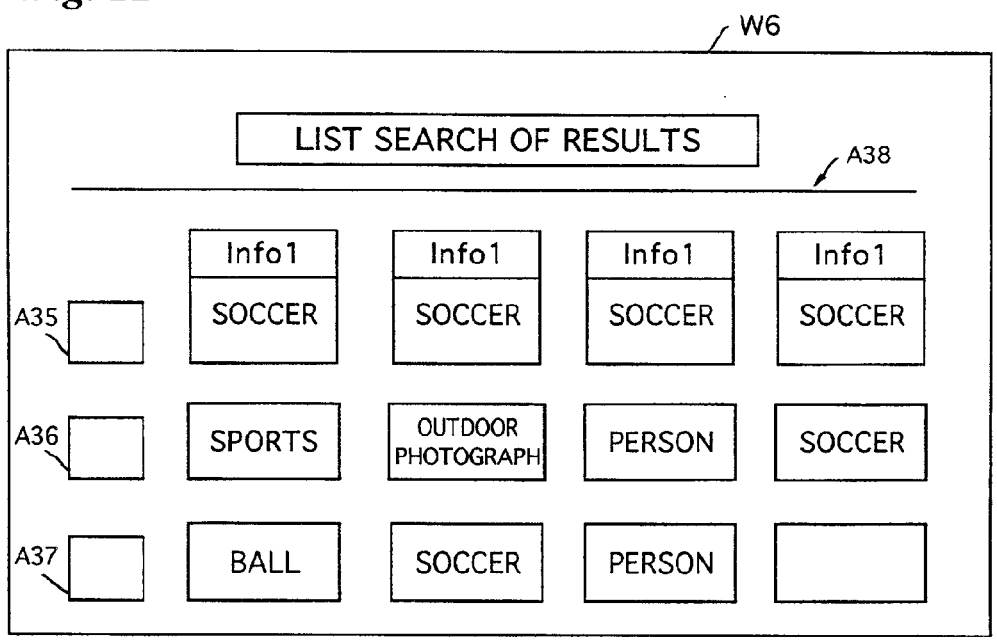
Figure 23:
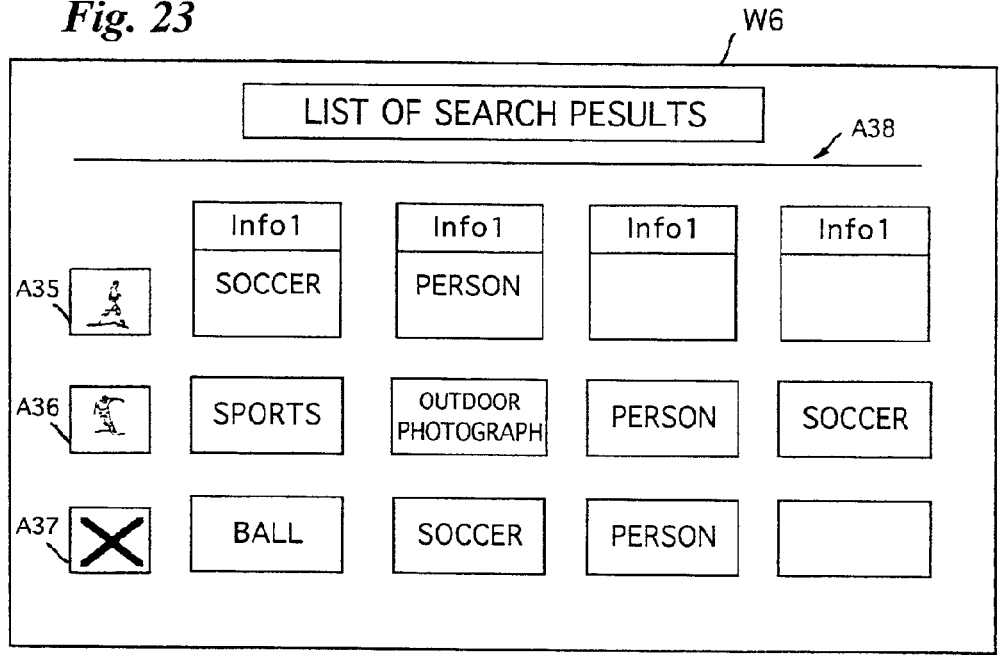

The data representing the search-result-list display page is applied to the HTML engine 3 of the client computer 1 and is input to the computer 2. As a result, a window W6 of the search-result-list display page shown in FIG. 22 is displayed on the display unit of the computer 2 (step 76). When the error-page data has been received, an error page is displayed on the display unit of the computer 2 (step 77). The window W6 of the search-result-list display page includes areas A35 to A37 in which thumbnail images are displayed and an area A38 in which keywords possessed by thumbnail images are displayed in association with the thumbnail images. As will be described later, an "x" mark is displayed in a thumbnail-image display area with regard to a thumbnail image for which there is no access privilege (see area A37 in FIG. 23). Since thumbnail images (as well as medium and large images) have been subjected to a format conversion so as to be displayable on the display unit of the computer 2 of the client computer 1, thumbnail-image files need not be subjected to a format conversion by the client computer 1 in order to be displayed on its display unit.

When the window W6 (see FIG. 22) of the search-result-list display page is displayed the first time, nothing is displayed in the areas A35 to A37. By observing the keywords displayed in the area A38, the user of the client computer 1 judges whether the thumbnail images specified by these keywords are necessary. If a thumbnail image is necessary, the desired area from among the areas A35 to A37 that corresponds to the keywords is clicked. When this is done, a request to transmit the corresponding thumbnail image and data indicating the record number of this thumbnail image are transmitted from the client computer 1 to the server system 10 (step 79).

The access table (FIG. 7) in which the transmitted record number has been stored is found from the database by the database controller 14. A user table (FIG. 3) containing the user ID already transmitted from the client computer 1 is found and the group number is read out. On the basis of the group number that has been read out, it is determined whether the group has the privilege to access the thumbnail-image file for which transmission has been requested (step 120). If the group number possesses any one of the privileges 1 to 4, access to the thumbnail image is allowed. If the group number possesses privilege 0, access to the thumbnail image is denied.

If the client computer 1 has access privilege ("OK" at step 121), the corresponding image folder is retrieved based upon the record number (step 122) and the thumbnail-image file is read out. The thumbnail-image file that has been read out is transmitted from the Web server 11 to the client computer 1 (step 123). If the client computer 1 does not have access privilege ("NG" at step 121), "x"-mark data is transmitted to the client computer 1 (step 124). As a result, thumbnail images (A35 and A36 in FIG. 23) for which there is access privilege and an "x" mark (area A37 in FIG. 23) indicating that there is no access privilege are displayed in the window W6 of the search-result-list display page being displayed on the display unit of the computer 2.

If a thumbnail image being displayed in the window W6 of the search-result-list display page is clicked by the user of the client computer 1 ("YES" at step 82), a window for entering the user name and the group name to which the user belongs is displayed on the display unit of the computer 2. The user enters the user name and the group name (step 83). The user name and the user ID are read out by the computer 2. The record number of the image folder containing the user ID, the group name and the thumbnail-image file that has been clicked is transmitted from the image information storage unit 4 to the server system 10 (step 84).

On the basis of the user ID and record number, the database 15 in the server system 10 is searched and the corresponding user table is found. On the basis of privilege to access a detailed-information page that has been stored in this user table, whether the client computer 1 is capable of accessing the detailed-information page is checked (step 125).

If the client computer 1 does not have the privilege to access the detailed-information page ("NG" at step 126), error-page data is transmitted to the client computer 1 (step 128). If the client computer 1 does have the privilege to access the detailed-information page ("OK" at step 126), data representing a detailed-information display page is transmitted from the server system 10 to the client computer 1 (step 127).

Figure 24:
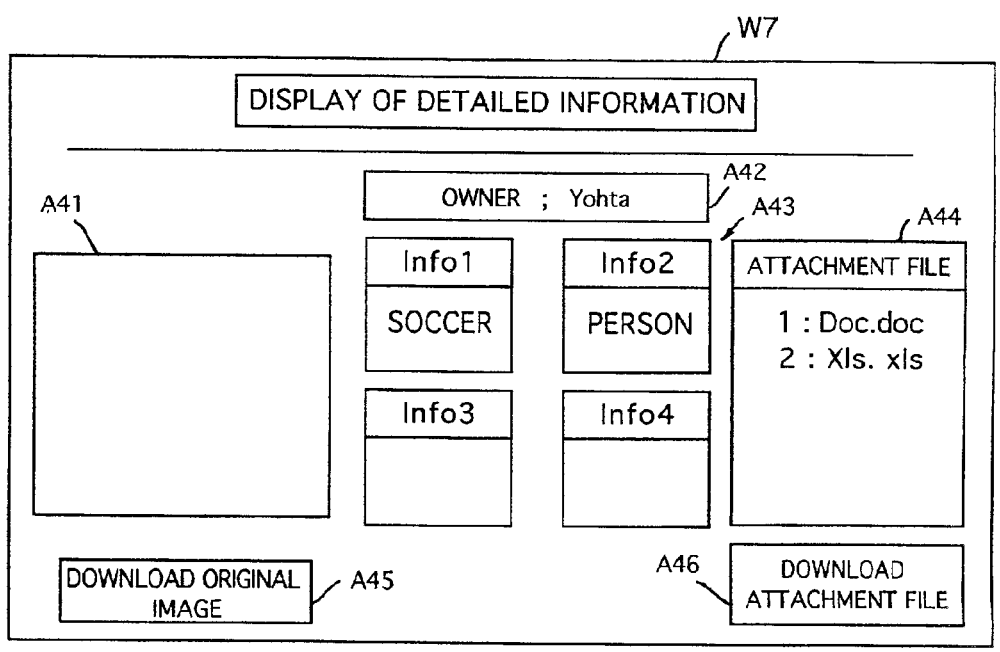

When the error-page data is received at the client computer 1, an error-page window is displayed on the display unit of the computer 2 (step 86). By observing the error-page window, the user of the client computer 1 becomes aware of the fact that he or she does not possess the privilege to obtain detailed information regarding the thumbnail image requested. When the data representing the detailed-information display page is received by the client computer 1, a detailed-information display-page window W7 of the kind shown in FIG. 24 is displayed on the display unit of the computer 2 (step 85).

The detailed-information display-page window W7 includes the following areas:

Medium-image display area A41: This is an area which displays a medium image represented by a medium-image file possessing a greater quantity of data than the thumbnail-image file. A medium image is not displayed in the area A41 the first time the detailed-information display-page window W7 is displayed.

Owner display area A42: This is an area which displays the name of the owner of the original image (the person who registered the original image) of a thumbnail image for which detailed information has been requested.

Keyword display area A43: This is an area which displays corresponding keywords.

Attachment-file display area A44: When an original-image file corresponding to a medium-image file has an attachment file, the name of this attachment file is displayed in this area.

Original-image download area A45: This is an area clicked by the user of the client computer 1 when an original-image file is to be downloaded.

Attachment-file download area A46: This is an area clicked by the user of the client computer 1 when an attachment file is to be downloaded.

When a medium-image file is downloaded, the user of the client computer 1 clicks the medium-image display area A41 (step 87), whereupon data representing a request for the medium image is transmitted from the client computer 1 to the server system 10 (step 88).

The server system 10 refers to the access table based upon the group number that has already been transmitted from the server system 10 and checks to see whether the client computer 1 has the privilege to access the medium image (step 129). If the number of the group to which the client computer 1 belongs has access privilege 2, 3, or 4, the client computer 1 is privileged to access the medium image. If the number of the group to which the client computer 1 belongs has access privilege 0 or 1, the client computer 1 does not have privilege to access the medium image.

If the client computer 1 has access privilege ("OK" at step 130), reference is had to the record number, the image folder is found from the image file unit 17 and the medium-image file that has been stored in this image folder is read out. The medium-image file that has been read out is transmitted to the client computer 1 by the Web server 11 (step 132). If the client computer 1 does not possess access privilege ("NG" at step 130), data indicative of the "x" mark is transmitted to the client computer 1 (step 131).

Figure 25:
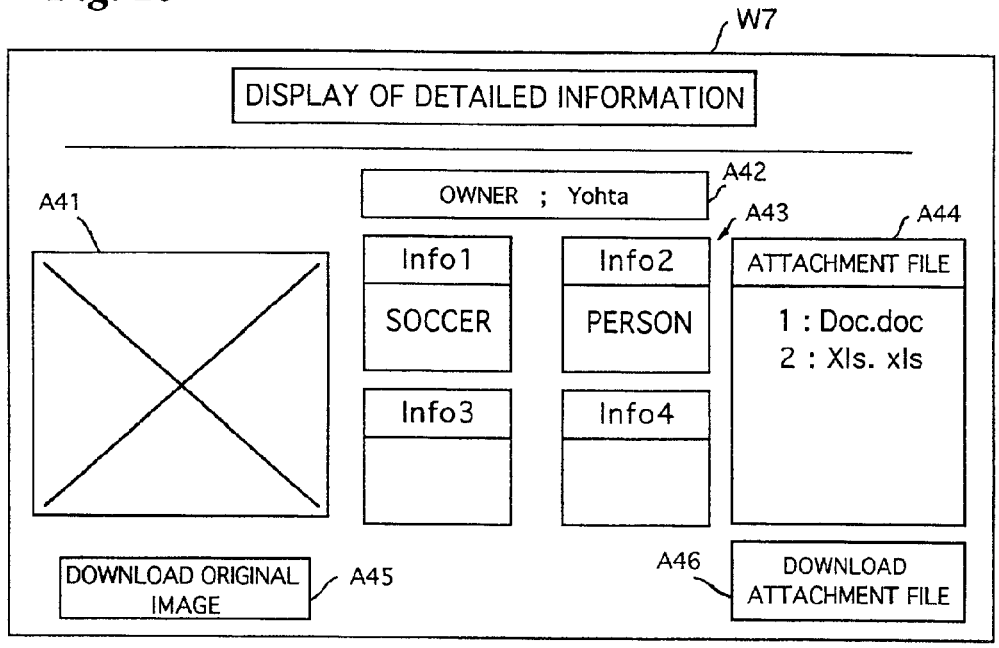

When data indicative of the "x" mark is transmitted from the server system 10, the "x" mark is displayed in the medium-image display area A41 of the detailed-information display-page window W7 being displayed on the display unit of the computer 2 of client computer 1 (step 90; see FIG. 25). When the medium-image file is transmitted from the server system 10, the medium image is displayed in the medium-image display area A41 of the detailed-information display-page window W7 being displayed on the display unit of the computer 2 (step 89; see FIG. 26).

When a large image is necessary, the medium image being displayed in the medium-image display area A41 is clicked ("YES" at step 91). When this is done, a window for entering the user name and group name is displayed on the display unit of the computer 2. The user enters the user name and group name (step 92). The user ID corresponding to the entered user name is read out of the computer 2 and the user ID, group name and corresponding record number are transmitted from the client computer 1 to the server system 10 (step 93).

The database 15 in the server system 10 is searched and the access table having the transmitted record number is found. Whether or not access to a large image is allowed is verified based upon the access table (step 133). If the record number of the client computer 1 has privilege 3 or 4, the client computer 1 is allowed to access the large image. If the record number of the client computer 1 has privilege 0, 1 or 2, the client computer 1 is denied access to the large image.

If access to the large image is allowed ("OK" at step 134), the large-image file contained in the image folder identified by the record number is read out and the file is then transmitted to the client computer 1 by the Web server 11 (step 136). If access to the large image has been denied ("NG" at step 134), data indicative of the "x" mark is transmitted to the client computer 1 (step 135).

Figure 27:
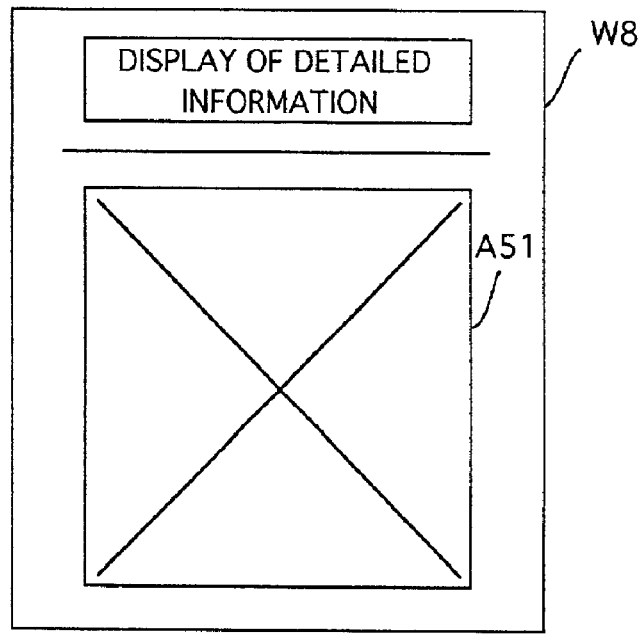
Figure 28:
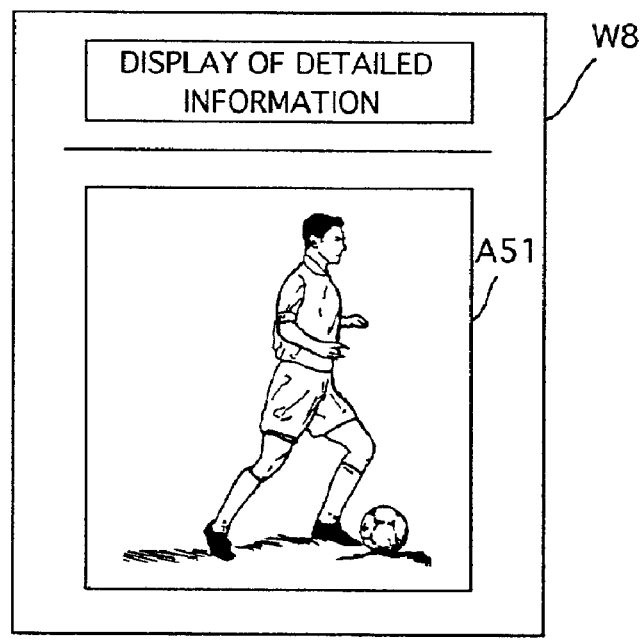

If the large-image file is transmitted to the client computer 1, a large image of the kind shown in FIG. 28 is displayed on the display unit of the computer 2 (step 94). Since the user of the client computer 1 can thus obtain a large image having a high resolution, a high-quality image can be printed by the user. If data indicative of the "x" mark is transmitted to the client computer 1, a window showing the "x" mark of the kind illustrated in FIG. 27 is displayed on the display unit of the computer 2 (step 95). The user of the client computer 1 thus ascertains that he or she does not have the privilege to access the large image.

If the original-image download area A45 or attachment-file download area A46 of the detailed-information display page is clicked, this signifies a request for an original-image file or attachment file (step 96). A window for entering the user name and group name is again displayed on the display unit of the computer 2. The user name and group number are entered by the user (step 98). The user ID is found from the user name and the data representing the user ID and group name is sent to the server system 10 (step 99).

Whether or not access to an original image or attachment file is allowed is verified by the server system 10 (step 137). More specifically, when the user ID and group name are received by the server system 10, the user table identified by this user ID is found. Reference is had to the binary-access privilege of the user table to check whether binary-access privilege has been granted or not. If binary-access privilege has been granted, the downloading of the attachment file is allowed. If there is a request to download an original-image file, reference is had also to the access table to check the access privilege of the group to which the client computer 1 belongs. If the access privilege of the group to which the client computer 1 belongs is 4, then access to the original-image file is granted. If the access privilege is not 4, then access to the original-image file is denied.

If access has been allowed ("OK" at step 138), the original-image file or attachment file contained in the image folder of the record number that has already been transmitted to the server system 10 is read out of the image file unit 17. The file that has been read out is transmitted to the client computer 1 by the Web server 11 (step 140). If access has been denied ("NG" at step 138), error-page data is transmitted to the client computer 1 (step 139).

When the original-image file or attachment file is transmitted from the server system 10, a window indicating that downloading is in progress is displayed on the display unit of the computer 2 (step 100). If error-page data is transmitted from the server system 10, an error-page window is displayed (step 101). By observing the error page, the user of the client computer 1 thus ascertains that he or she does not have the privilege to access the original-image file or attachment file.

In the embodiment described above, a keyword is transmitted from the client computer 1 to the server system 10 and an image file conforming to the keyword is searched for in the server system 10. An image file found as a result of the search is transmitted from the server system 10 to the client computer 1. When the user of the client computer 1 knows the record number that corresponds to an image file to be downloaded, the record number may be transmitted from the client computer 1 to the server system 10. The image file contained in the image storage folder identified by the record number is transmitted from the server system 10 to the client computer 1.

(2) Second Embodiment

Figure 29:
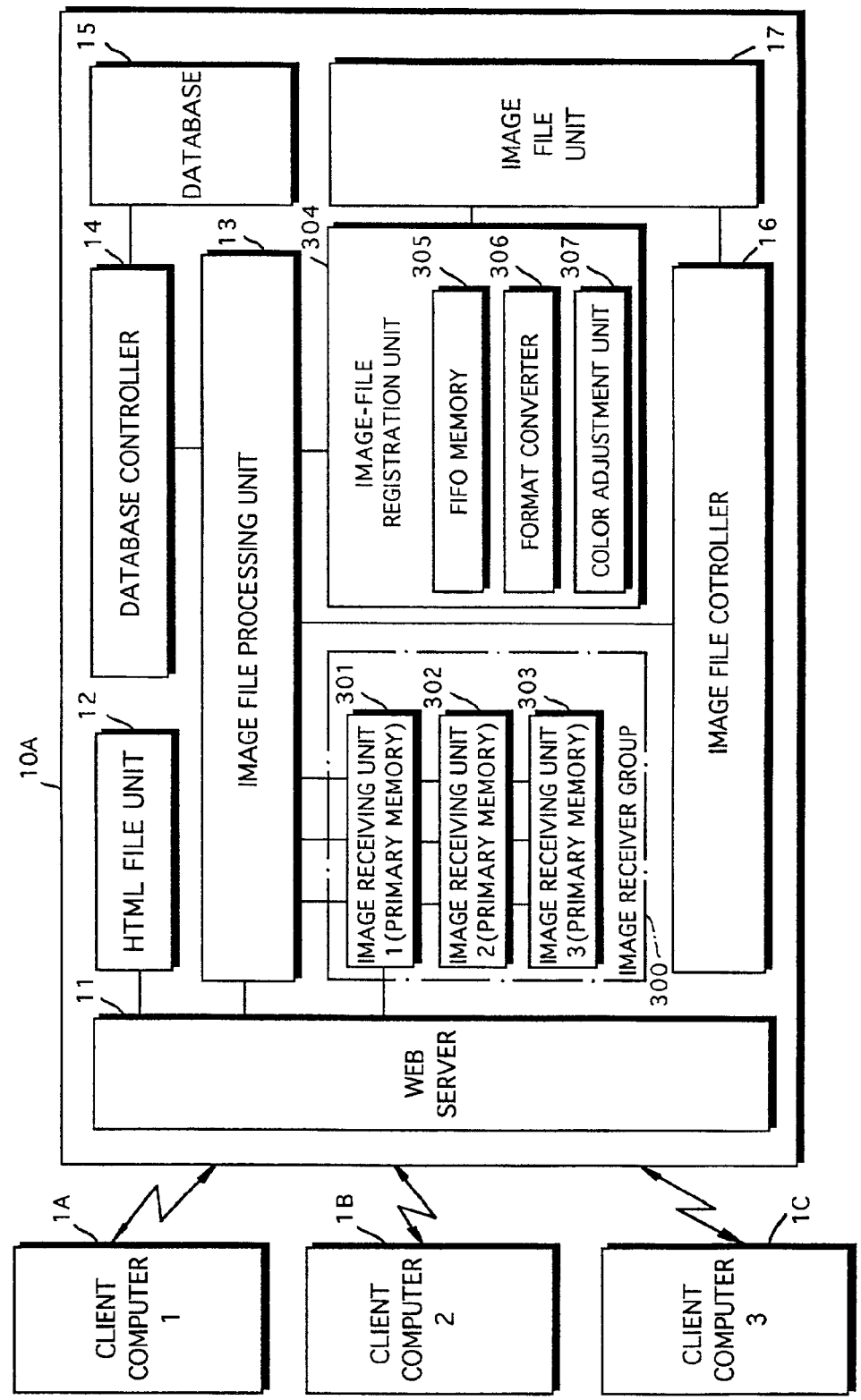
FIG. 29 is a block diagram illustrating the electrical structure of a server system capable of communicating with the client computer in a second embodiment of the present invention.

FIG. 29 is a block diagram showing the electrical structure of a server system according to a second embodiment of the present invention. Components in FIG. 29 identical with those shown in FIG. 2 are designated by like reference characters and need not be described again.

A plurality of client computers (three in this case) 1A, 1B and 1C are connected to a server system 10A via a network so as to be capable of communicating with the server system.

The server system 10A shown in FIG. 29 includes an image receiver group 300 in order to receive original-image data transmitted from the client computers 1A, 1B, 1C, etc. The image receiver group 300 includes three image receiving units 301, 302 and 303, which correspond to the number of client computers 1A, 1B, 1C capable of communicating with the server system 10A. The image receiving units 301, 302 and 303 include respective ones of primary memories for temporarily storing original-image data that has been transmitted from the client computers 1A, 1B and 1C.

Original-image data that has been transmitted from the client computer 1A is received by the first image receiving unit 301 and is stored temporarily in the primary memory contained in the first image receiving unit 301. Original-image data that has been transmitted from the client computer 1B is received by the second image receiving unit 302 and is stored temporarily in the primary memory contained in the second image receiving unit 302. Original-image data that has been transmitted from the client computer 1C is received by the third image receiving unit 303 and is stored temporarily in the primary memory contained in the third image receiving unit 303. Since the primary memory is thus decided in dependence upon the client computer, memory management becomes comparatively easy.

The quantities of data capable of being stored in the primary memories contained in respective image receiving units 301, 302 and 303 are stipulated in advance in correspondence with the client computers 1A, 1B and 1C, respectively. Consequently, the quantity of data that can be transmitted from each of the client computers 1A, 1B and 1C to the server system 10A at one time is decided in advance. The client computers 1A, 1B and 1C thus transmit data to the server system 10A in accordance with the data quantity that has been decided for each client computer.

The server system 10A includes an image-file registration unit 304. The latter includes a format converter 306 for converting the data format of image data, a color adjustment unit 307 for applying a color adjustment to an image represented by image data, and a FIFO memory 305 for temporarily storing image data.

Figure 30:
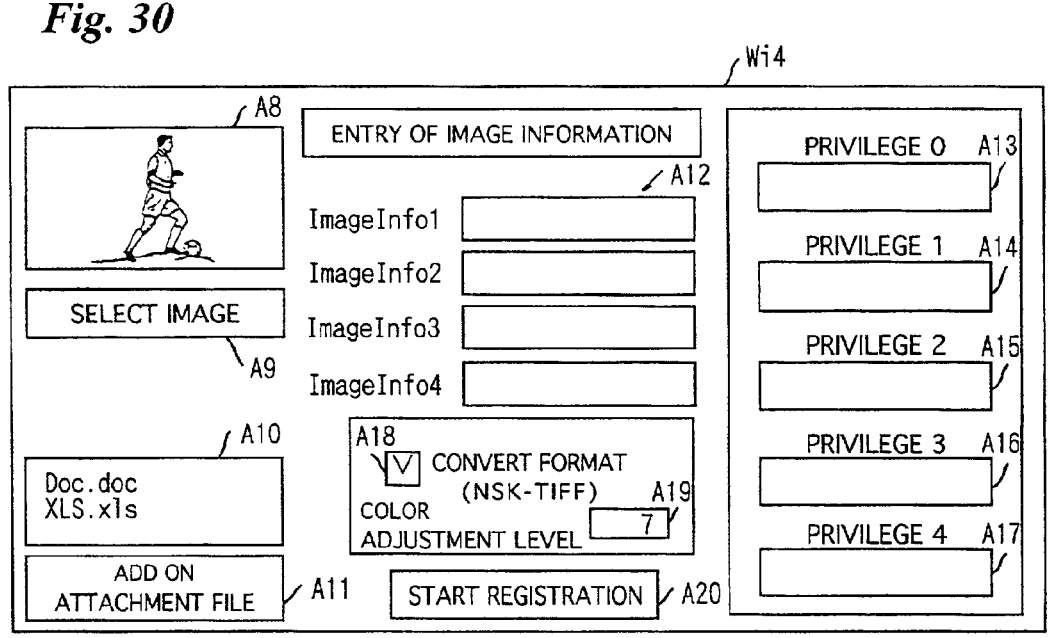
FIG. 30 illustrates an example of a window displayed on the display unit of the client computer.

FIG. 30 shows an example of a window displayed on a display unit included in each client computer. FIG. 30 shows an image-information input window Wi4 and corresponds to the window illustrated in FIG. 16. Fields and areas in FIG. 30 identical with those shown in FIG. 16 are designated by like reference characters and need not be described again.

The image-information input window Wi4 shown in FIG. 30 includes a format-conversion designating area A18. The latter is an area which the user of the client computer clicks using a mouse or the like when original-image data is to be converted to a predetermined specific format [NSK-TIFF (Nihon Shimbun Kyokai—Tag Image File Format) in this example] in the server system 10A. It goes without saying that the format conversion is carried out by the format converter 306.

The image-information input window Wi4 includes a field A19 for setting the color adjustment level. The user of the client computer enters the color adjustment level in field A19 using a keyboard, for example. The color adjustment levels are from 1 to 7. Level 1 specifies color adjustment of a thumbnail image, level 2 color adjustment of a medium image, level 3 color adjustment of a thumbnail image and intermediate image, level 4 color adjustment of a large image, level 5 color adjustment of an thumbnail image and large image, level 6 color adjustment of an medium image and large image, and level 7 color adjustment of a thumbnail image, medium image and large image.

Figure 31:
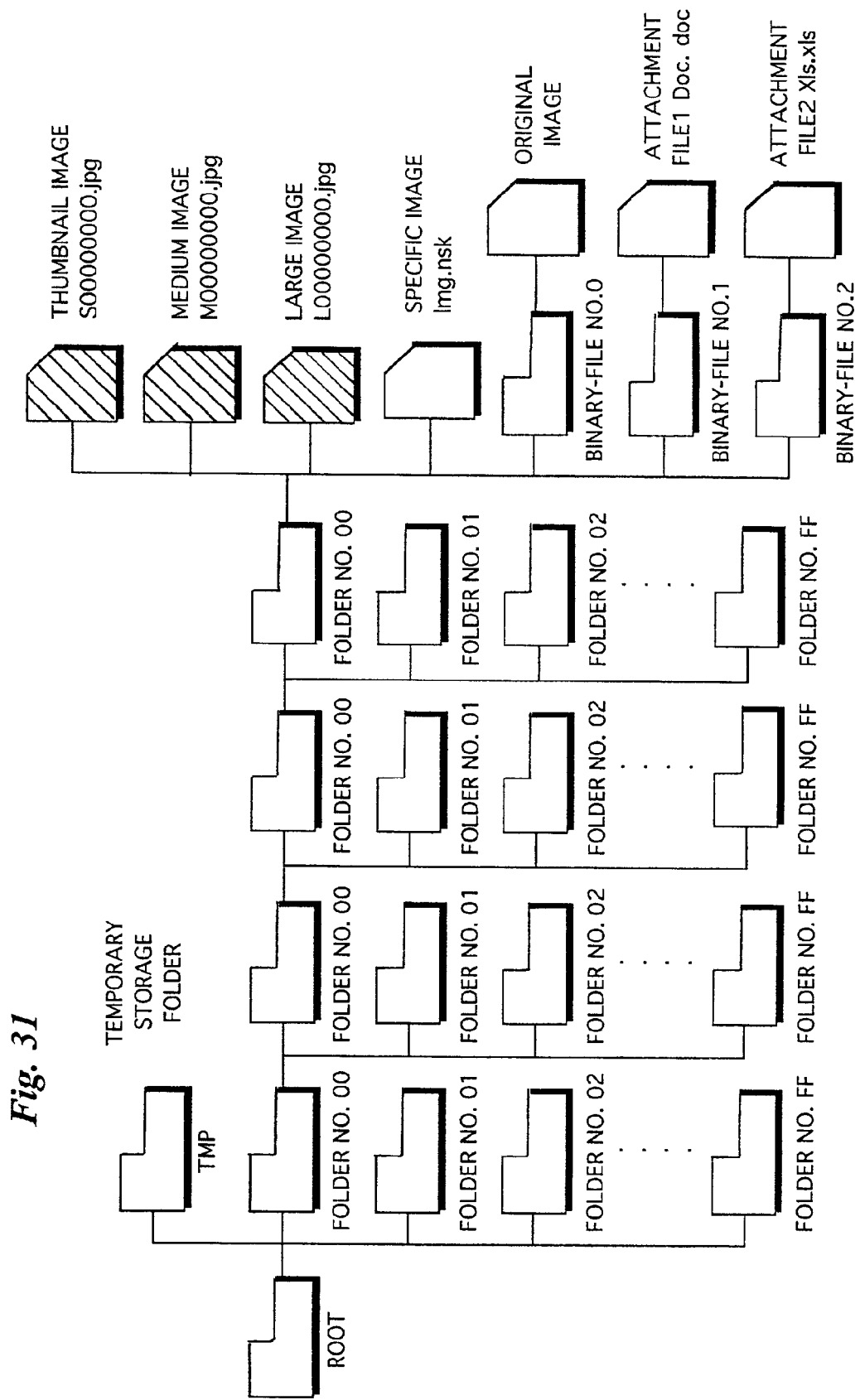
FIG. 31 illustrates the organization of folders.

FIG. 31 illustrates the organization of a folder stored in the image file unit 17. This corresponds to FIG. 9.

In the second embodiment, an original-image file is converted to a specific format (which may be a format identical with or different from that of a large-image file that has undergone a format conversion) in the server system 10A when the user of the client computer specifies a format conversion. Further, when the color adjustment level is set, the image that conforms to the setting undergoes a color adjustment. In FIG. 31, a specific image file having the specific NSK-TIFF format has been stored in the same folder as that containing the original-image file. Further, the large, medium and thumbnail images have all undergone color adjustments (these image files are hatched in order to indicate the fact that the images have undergone color adjustment).

Figure 32:
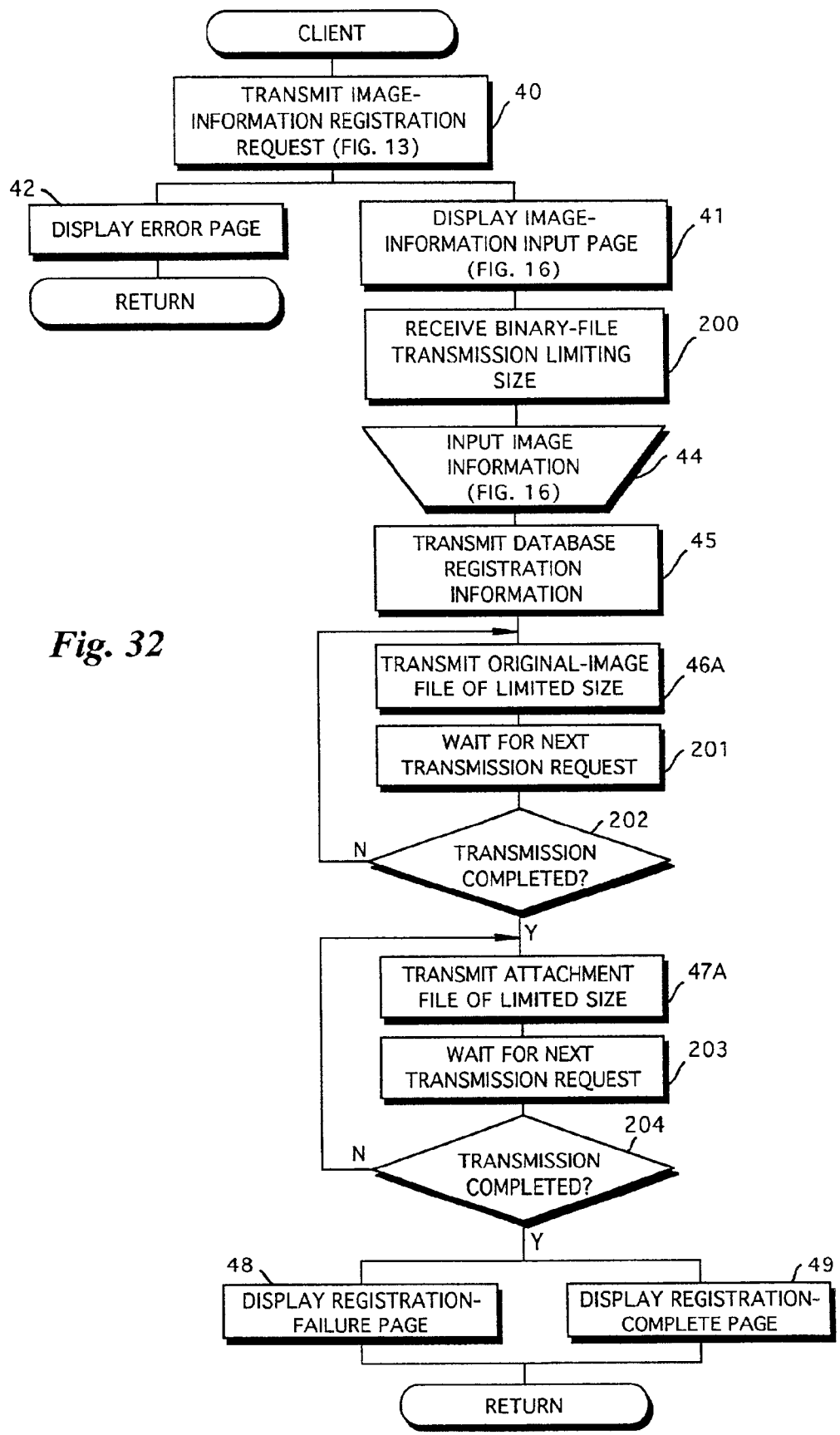
FIG. 32 is a flowchart illustrating the procedure of processing executed by the client computer when an image file is registered.
Figure 33:
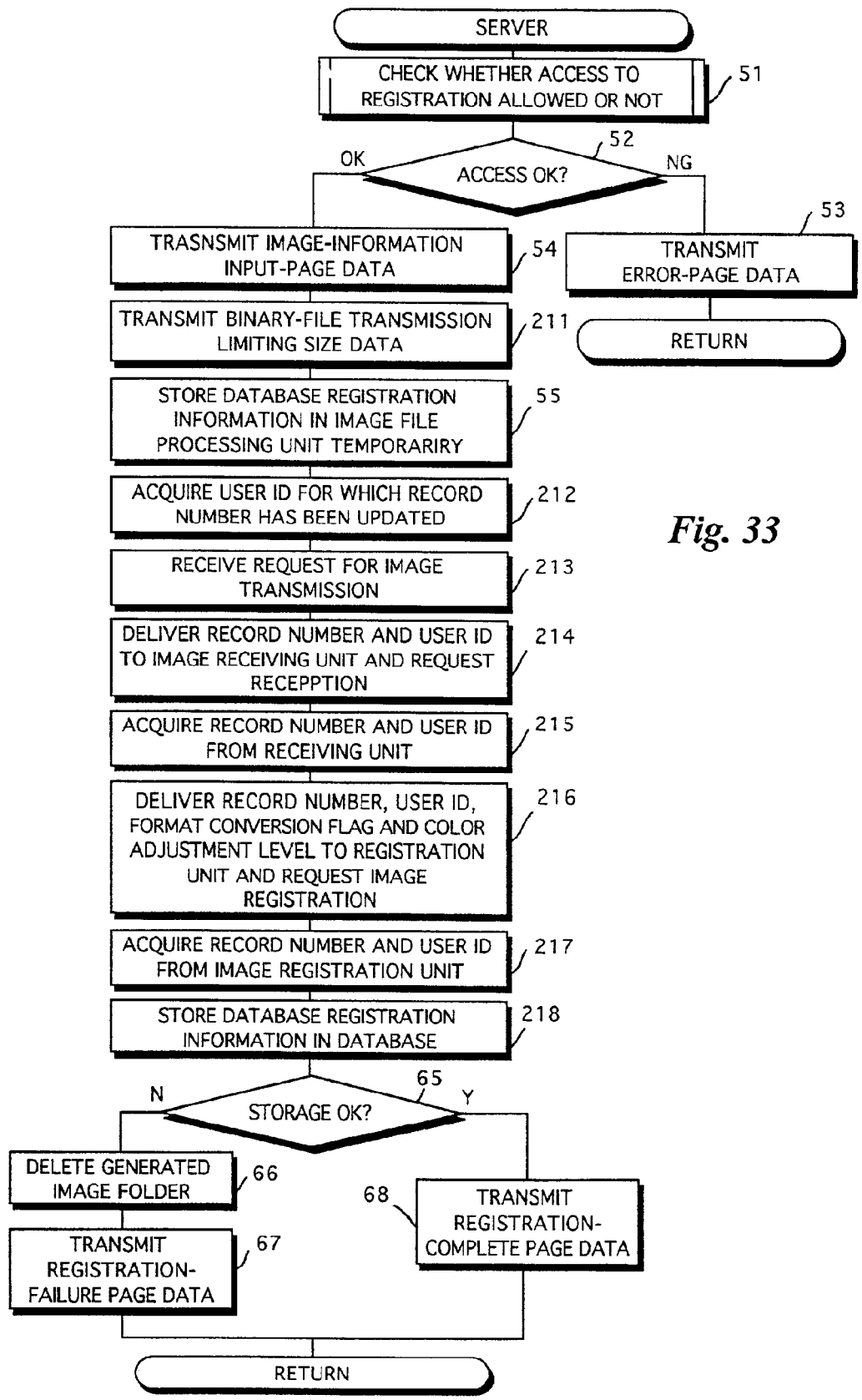
FIG. 33 is a flowchart illustrating the procedure of processing executed by the server system when an image file is registered.

FIGS. 32 and 33 are flowcharts showing the procedure of processing for registering image information. The processing is split between one of the client computers 1A, 1B and 1C and the server system 10A. These flowcharts correspond to the flowcharts shown in FIGS. 14 and 15. Processing steps in FIGS. 32 and 33 identical with those shown in FIGS. 14 and 15 are designated by like step numbers and need not be described again.

As mentioned above, the image-information input window Wi4 shown in FIG. 30 is displayed on the display unit of the client computer (step 41) and various items of image information are entered. (It is assumed here that the format conversion area A18 has been checked and that the field for the color adjustment level has been set to level 7.)

Binary-file transmission limiting size data which indicates the quantity of data that can be transmitted to the server system 10A is transmitted from the server system 10 to the client computer that is accessing the server system 10A (step 211). Further, the user ID of the client computer for which the record number has been updated and which is accessing the server system 10A is acquired in the Web server 11 of the server system 10A (step 212). A request for image transmission is received from the client computer (step 213).

When the request for image transmission is received, the corresponding image receiving unit in the image receiver group 300 is provided with the record number and user ID from the Web server 11 and a reception request is issued to the image receiving unit (step 214). When the reception request is accepted from the Web server 11, the image receiving unit executes processing to receive an original-image file in an amount equivalent to the limited size. The details of this reception processing will be described later. When the processing for receiving the original-image file ends, the record number and user ID are supplied to the Web server 11 from the image receiving unit (step 215).

The binary-file transmission limiting size data that has been transmitted from the server system 10A is received by the client computer (step 200), whereupon the data quantity of the binary file capable of being transmitted from the client computer to the server system 10A is displayed on the display unit of the client computer. By observing the data quantity displayed on the display unit, the user of the client computer can tell the quantity of data that can be transmitted to the server system 10A.

When image information enters the client computer 1 (step 44) and database registration information is transmitted to the server system 10A (step 45), the original-image data in the amount equivalent to the size limited on the side of the server system is transmitted from the client computer to the server system 10A (step 46A). When original-image data of an amount in excess of the limited size is transmitted from the client computer to the server system 10A, the original-image data to be transmitted is split into portions the size of each of which is less than the limited size. The original-image data thus split is transmitted to the server system 10A over several cycles and is reconstructed into the original-image data in the server system 10A.

When the transmission of the original-image file in the amount equivalent to the limited size is completed by the client computer, the client computer waits for the next transmission request from the server system 10A (step 201). The processing of steps 46A to 201 is repeated until the entire transmission of the original-image file to be transmitted to the server system 10A ends (step 202).

When the entire transmission of the original-image file is completed, an attachment file is transmitted from the client computer to the server system 10A in data quantities of the limited size in a manner similar to that in which the original-image file was transmitted (steps 47A, 203, 204).

When the reception of the original-image file and attachment file at the server system 10A is completed in its entirety and the record number and user ID are provided by the image receiving unit, the record number, the user ID, a format conversion flag (if the area A18 in the image-information input window Wi4 is checked, a format conversion flag is transmitted from the client computer to the server system 10A) and data representing the color adjustment level (the data representing the color adjustment level is transmitted from the client computer to the server system 10A by entering the color adjustment level in field A19 of the image-information input window Wi4) are supplied from the Web server 11 to the image-file registration unit 304 (step 216). When this is done, the image-file registration unit 304 executes image-file registration processing. The details of image-file registration processing in the image-file registration unit 304 will be described later. When image-file registration processing by the image-file registration unit 304 ends, the image-file registration unit 304 provides the Web server 11 with the record number and user ID (step 217). The database registration information is thenceforth registered in the database 15 in the manner described above (step 218).

Figure 34:
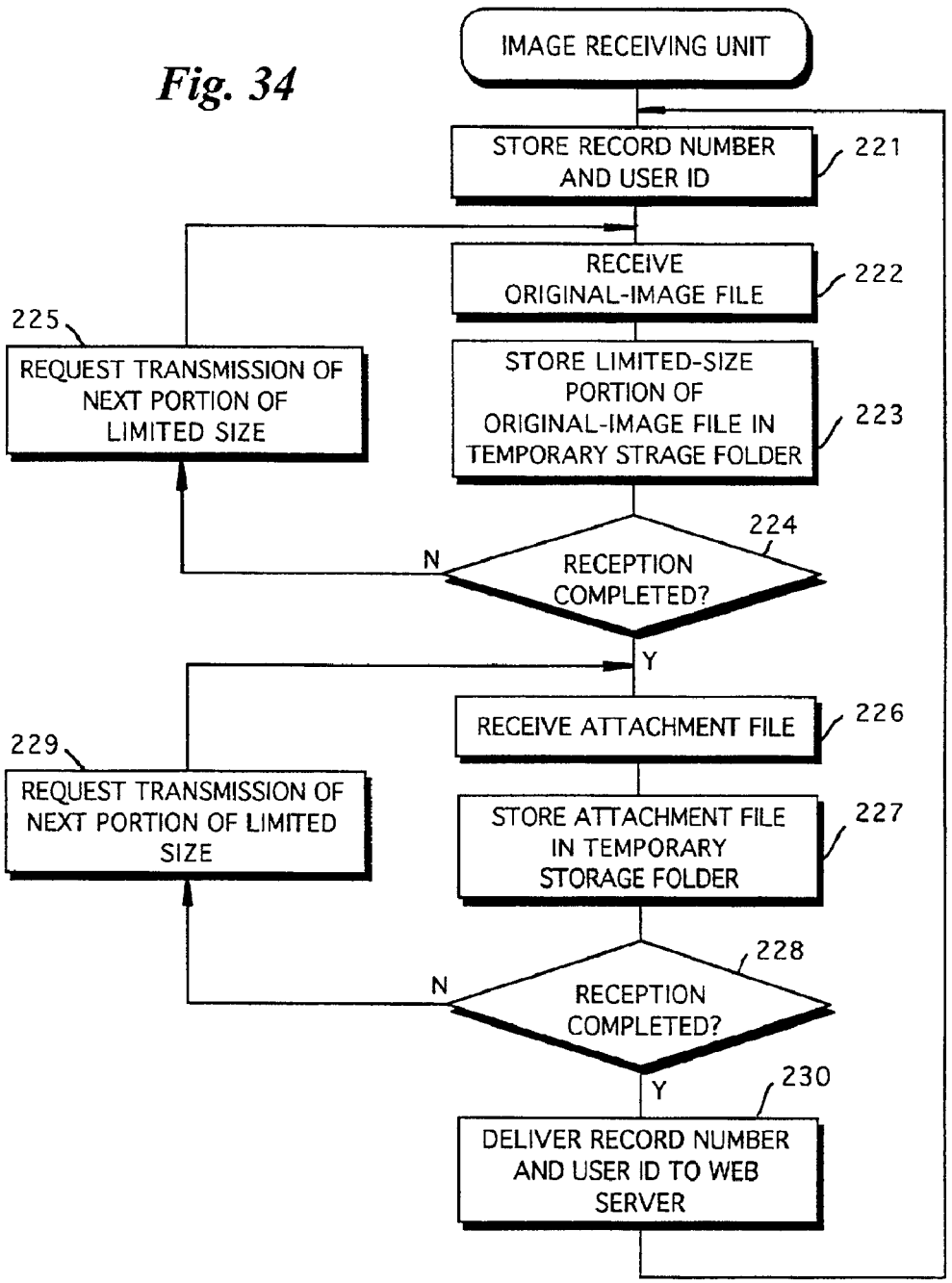
FIG. 34 is a flowchart illustrating the procedure of processing executed by an image receiving unit.

FIG. 34 is a flowchart of processing executed by the image receiving unit to receive an original-image file and an attachment file.

As mentioned above, the image receiving unit is provided with a record number and user ID by the Web server 11 (step 221). The client computer transmits an original-image file having the data quantity of the limited size for this client computer, and the original-image file is received by the image receiving unit (step 222). The received original-image file of the limited size is stored temporarily in the primary memory contained in the image receiving unit. The temporarily stored original-image file is read out of the image receiving unit and stored by the image-file registration unit 304 in the temporary storage folder of the image file unit 17 (step 223). Since the primary memory of the image receiving unit is emptied when this done ("NO" at step 224), a request for transmission of the next original-image file is transmitted to the client computer (step 225). Upon receiving the transmission request, the client computer responds by sending the server system 10A an original-image file having the data quantity of the limited size.

An attachment file also is transmitted from the client computer to the server system in data quantities of the limited size in a manner similar to that of the original-image file. The attachment file of the limited size is received by the image receiving unit and is stored temporarily in the primary memory (step 226). The attachment file stored temporarily in the image receiving unit is read out and is stored temporarily by the image-file registration unit 304 in the temporary storage folder of the image file unit (step 227). If there is a next attachment file ("NO" at step 228), a transmission request for this file is sent from the image receiving unit to the client computer (step 229).

If all original-image files and attachment files to be transmitted from the client computer are received by the image receiving unit and these are stored in the temporary storage folder of the image file unit 17, the Web server is provided with the record number and user ID by the image receiving unit (step 230).

Figure 35:
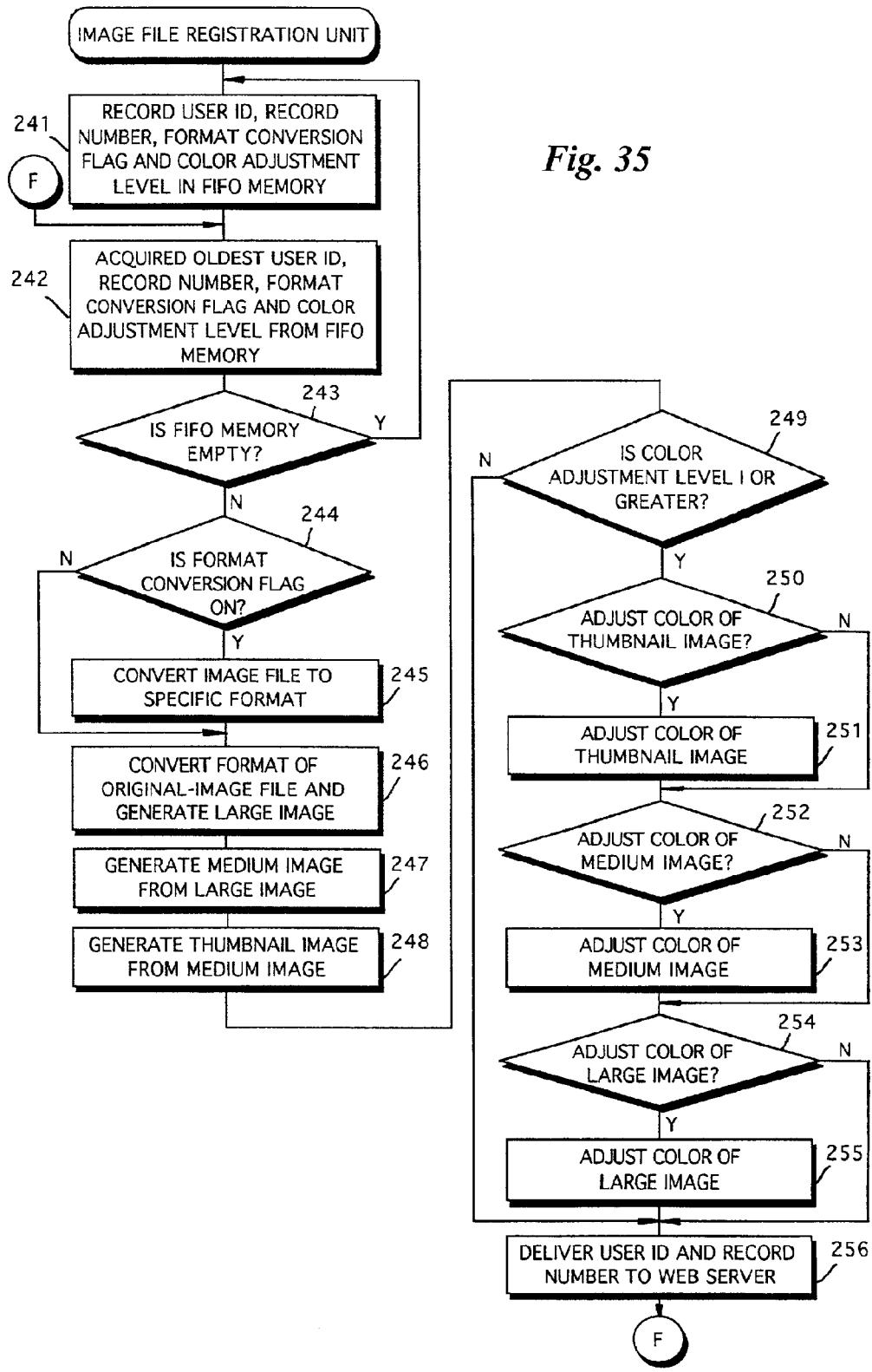
FIG. 35 is a flowchart illustrating the procedure of processing executed by an image-file registration unit.

FIG. 35 is a flowchart illustrating the procedure of image-file registration processing executed by the image-file registration unit 304.

A user ID, record number, file conversion flag and color adjustment level provided by the image receiving unit are registered in the FIFO memory 305 (step 241). The oldest user ID, record number, file conversion flag and color adjustment level among the user IDs, record numbers, file conversion flags and color adjustment levels that have been registered in the FIFO memory 305 are then read out of the memory and updated (step 242).

If the FIFO memory 305 is not empty ("NO" at step 243), this indicates that image data not yet processed resides in the image-file registration unit 304. Processing described below is executed in the order of the user IDs that have been registered in the FIFO memory 305.

First, it is determined whether the file conversion flag is on (step 244). If the area A18 on the image-information input page has been checked by the user of the client computer, this means that the file conversion flag is on. If the file conversion flag is on, the original-image file that has been transmitted from the client computer and stored in a folder specified by the record number is read out of the image file unit 17. The original-image file read out is converted to the specific NSK-TIFF format (step 245). A specific image file is generated by the format conversion. The generated specific image file is stored in the same folder as that storing the original-image file that has been read out.

As described in the first embodiment, the original-image file is subjected to a format conversion to generate a large-image file (step 246), a medium-image file is generated from the large-image file (step 247), and a thumbnail-image file is generated from the generated medium-image file (step 248).

It is determined whether the color adjustment level is 1 or greater (step 249). If the color adjustment level is 1 or greater, this indicates that the user of the client computer has made a setting so as to apply a color adjustment to at least one image among the large, medium and thumbnail images.

By checking the color adjustment level, whether the color adjustment is applied to the thumbnail image (step 250), medium image (step 252) or large image (step 254) is verified. Depending upon the color adjustment level, color adjustment of any or all of a thumbnail image (step 251), medium image (step 253) and large image (step 255) is executed.

When the above-described format conversion and color adjustment processing end, the image-file registration unit 304 provides the Web server 11 with the user ID and record number (step 256). Subsequently using the user ID and record number makes processing possible in the Web server 11.

The quantity of data capable of being transmitted to the server system 10A is allocated beforehand in the server system 10A in accordance with the client computer that is capable of accessing the server system 10A. This makes it possible to prevent an accident in which only a specific client computer can access the server system 10A to the exclusion of other client computers.

Further, since a specific image file having a predetermined specific format is generated, a client computer that requires an image file having the specific format can obtain the image file having the required format merely by downloading the specific image file from the server system 10A. This obviates format conversion labor on the side of the client computer.

Figure 26:
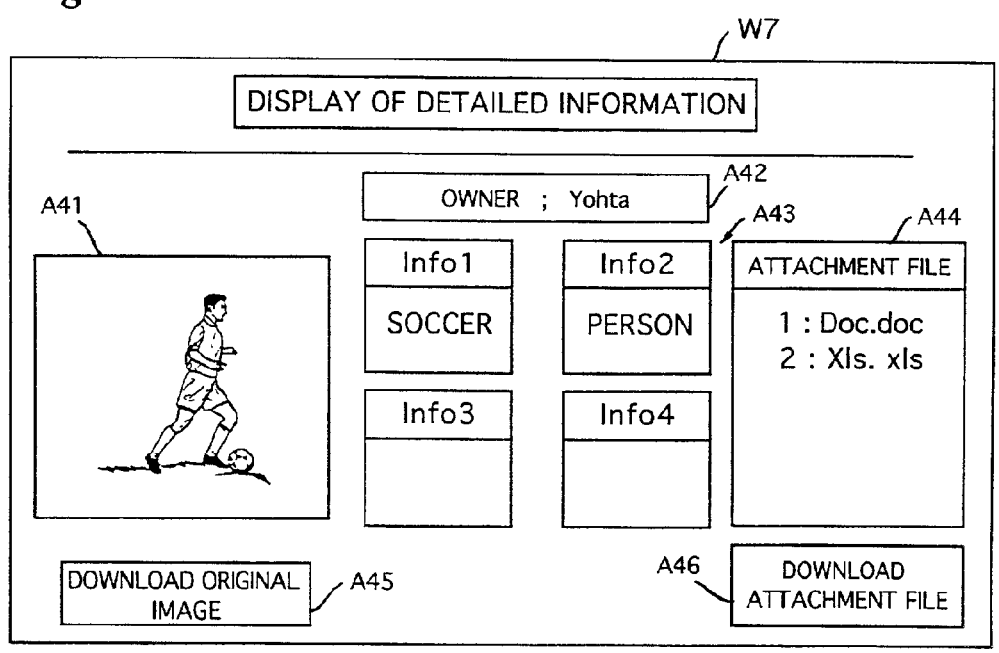
Figure 36:
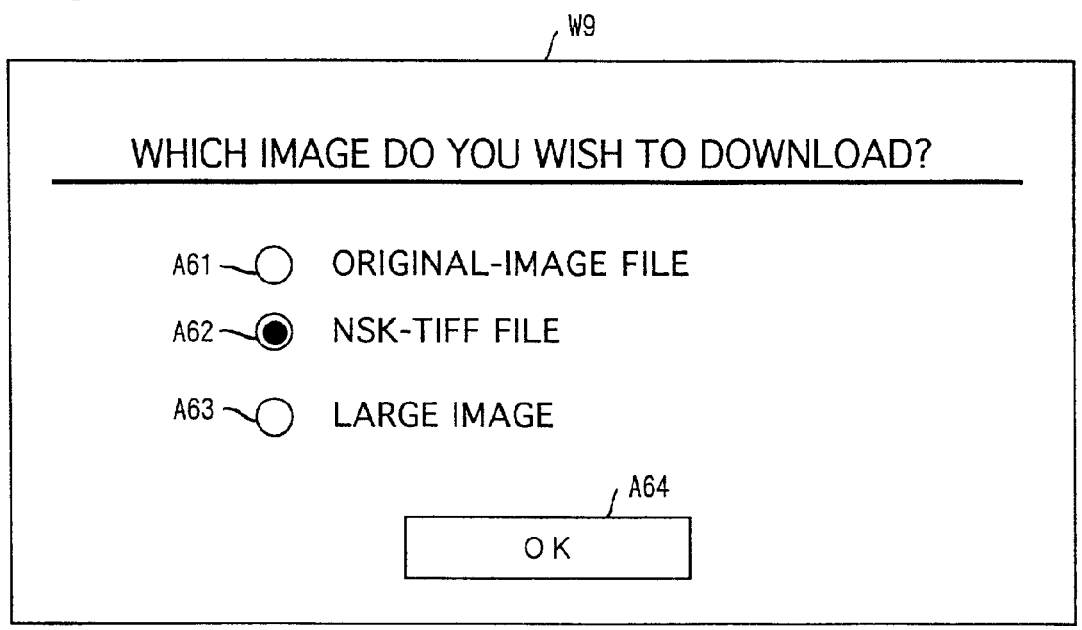
FIG. 36 illustrates an example of a window displayed on the display unit of the client computer.

A window W9 of the kind shown in FIG. 36 is displayed on the display unit of the client computer to make it possible to download such a specific image file to the client computer. By clicking the original-image download area A45 when the window illustrated in FIGS. 24 to 26 is being displayed, the user causes the window W9 to be displayed on the display unit.

The window A9 includes an area A61 clicked by the user when an original-image file is to be downloaded, an area A62 clicked by the user when an NSK-TIFF file (the specific image file) is to be downloaded, an area A63 clicked by the user when a large-image file is to be downloaded, and an "OK" area A64 for verifying the area checked.

One or a plurality of the areas A61, A62 and A63 can be checked. The image file designated by the checked area would be read out of the image file unit 17 of server system 10A and transmitted to the client computer.

Since color adjustment processing is carried out, an image having excellent color reproducibility can be obtained.

(3) Third Embodiments

FIGS. 37 to 48 illustrate a third embodiment of the present invention.

Figure 37:
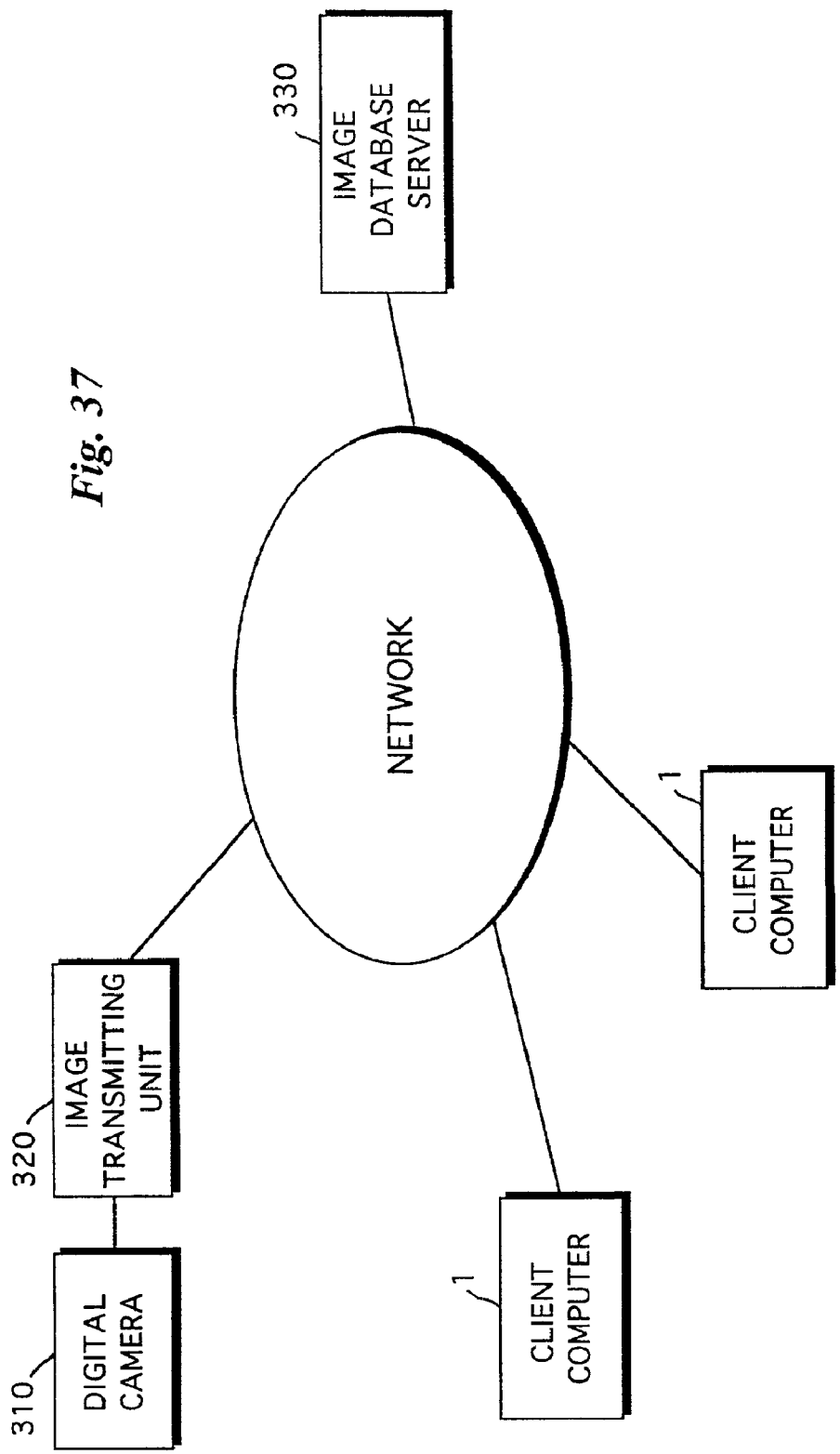
FIG. 37 illustrates the overall configuration of a system according to a third embodiment of the present invention.

FIG. 37 illustrates the overall configuration of an image data communication system according to the third embodiment.

An image transmitting unit 320 and an image database server 330 are connected via a network such as the Internet so as to be capable of communicating with each other. As will be described later, an image file obtained by image sensing using a digital camera 310 is applied to the image transmitting unit 320. The image file is transmitted from the image transmitting unit 320 to the image database server 330.

Client computers 1 capable of communicating with the image database server 330 also is connected to the network.

Figure 38:
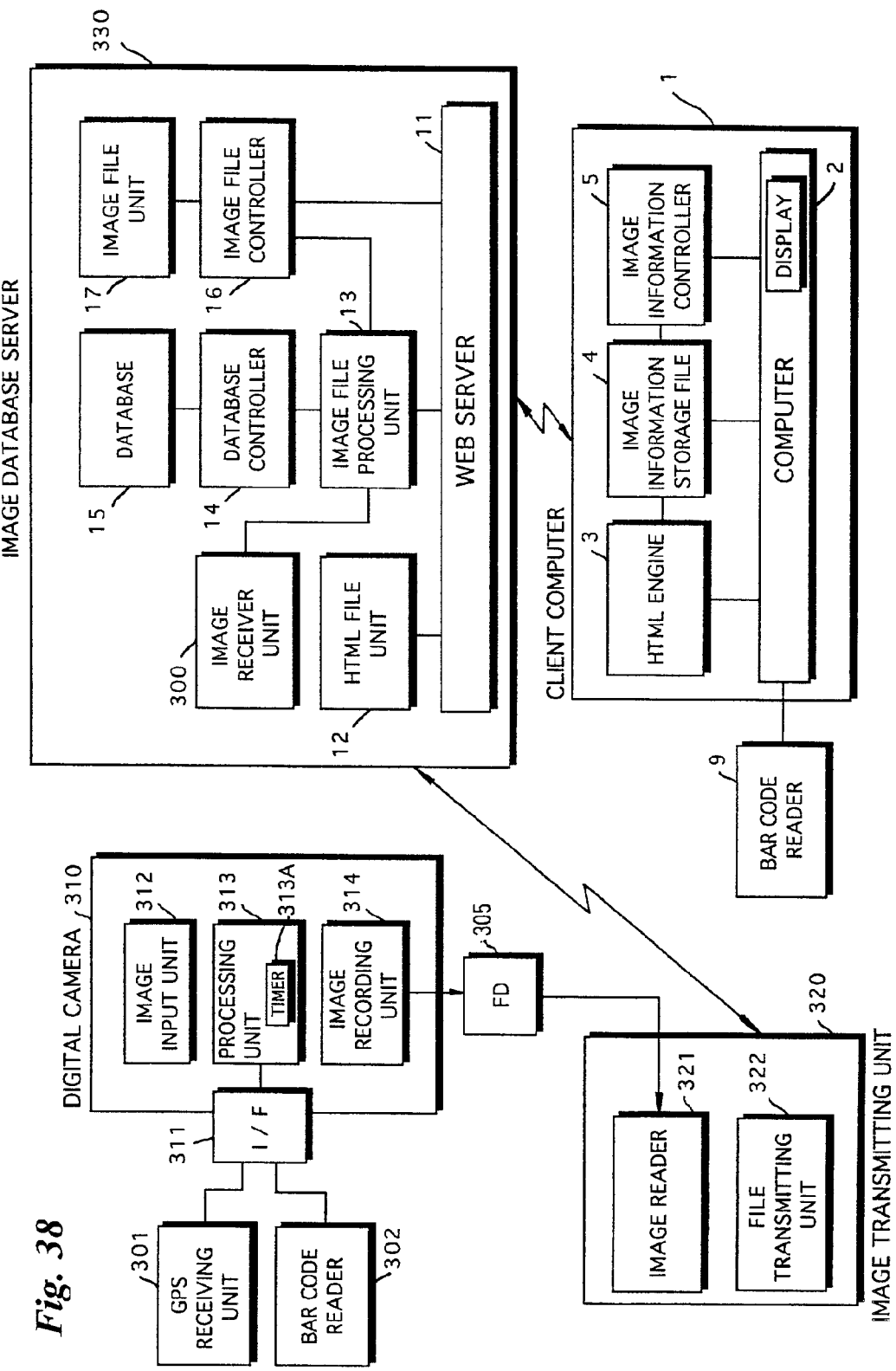
FIG. 38 is a block diagram illustrating the electrical structures of a digital camera, image transmitting unit, image database server and client computer constructing the system shown in FIG. 37.

FIG. 38 is a block diagram showing the electrical structures of the digital camera 310, image transmitting unit 320, image database server 330 and client computer 1. Components in FIG. 38 that are identical with those of the client computer and server system of the first embodiment are designated by like reference characters and need not be described again. The client computers 1 of the first embodiment correspond to the client computers 1 in the third embodiment, and the server system of the first embodiment corresponds to the image database server 330 in the third embodiment.

The digital camera 310 includes an image input unit 312 for sensing the image of a subject and outputting image data representing the image of the subject, a processing unit 313 for executing predetermined signal processing such as data compression and a gamma correction based upon the image data output from the image input unit 312, and an image recording unit 314 for recording the image data, which has been subjected to signal processing by the processing unit 313, on a recording medium 305. The processing unit 313 has an internal timer 313A for measuring the time and date.

The digital camera 310 includes an interface 311 through which it is capable of being connected to a GPS (Global Positioning System) receiving unit 301 and bar code reader 302.

Position information is obtained by the GPS receiving unit 301 and data representing the position information is stored in an image file together with the image data. When a bar code is read by the bar code reader 302, data representing the bar code is applied to the image transmitting unit 320 and stored in the image file. The details of this processing will be described later.

The image transmitting unit 320 includes an image reader 321 and a file transmitter 322. The recording medium 305 on which the image file has been recorded by the image transmitting unit 320 can be inserted into image transmitting unit 320. The recording medium 305 that has been inserted into the image transmitting unit 320 is read by the image reader 321. The read image file is transmitted to the image database server 330 via the network.

The image file is received by the image database server 330 and the image data contained in the image file is stored in the image file unit 17. Data other than the image data contained in the image file is stored in the database 15. The details of this processing will be described later.

In addition to the components described in the first embodiment, a bar code reader 9 is connected to the client computer 1. A bar code can be read by the bar code reader 9 and the data representing the read bar code is transmitted from the client computer 1 to the image database server 330. When the data representing the bar code is received by the image database server 330, image data specified by the bar code represented by this data is read out of the image file unit 17 and transmitted to the client computer 1. An image is searched for using the bar code.

Figure 39:
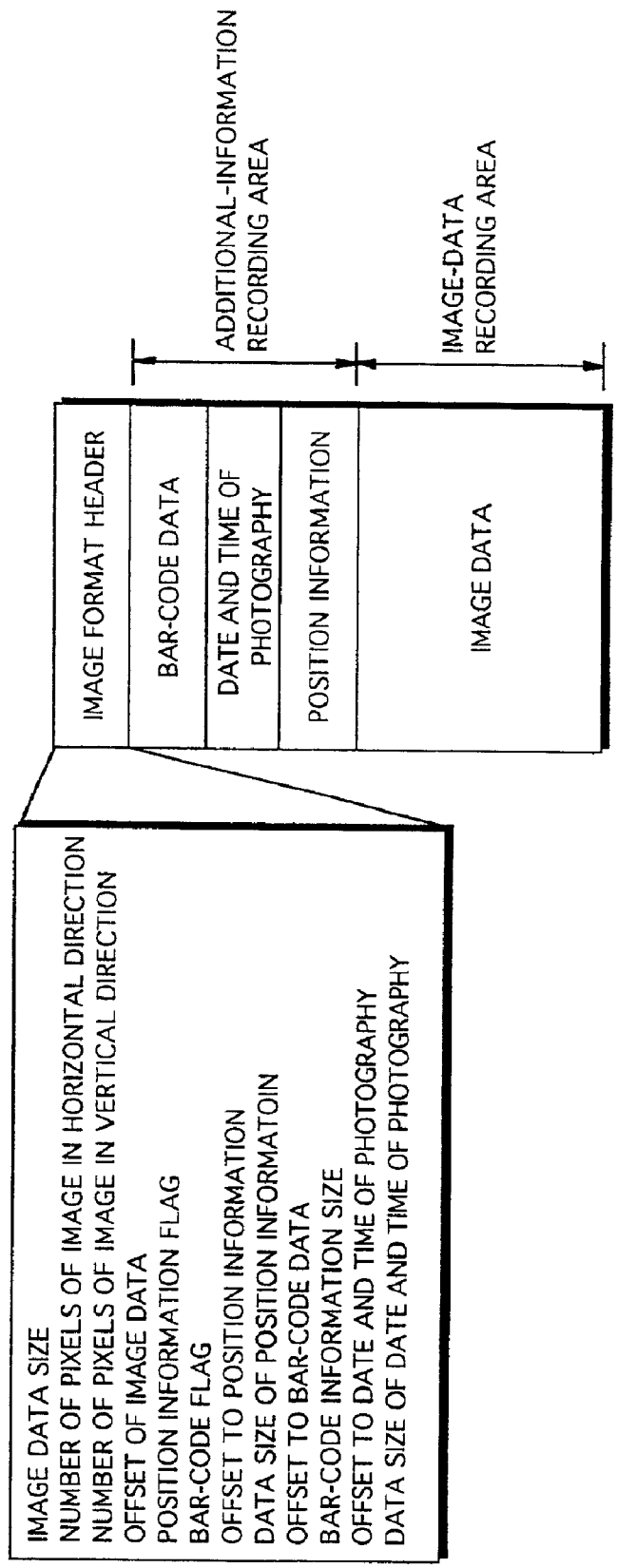
FIG. 39 illustrates the structure of an image file.

FIG. 39 is a diagram showing the structure of an image file generated by the digital camera.

The image file includes an image-format header for managing the overall image file, an additional-information area for recording additional information, and an image-data recording area for recording image data.

Recorded in the additional-information recording area are bar-code data representing a bar code that has been read by the bar code reader 302, data representing date of photography and position information representing the location of photography sensed by the GPS receiving unit 301.

The image-format header contains the size of the image data that has been recorded in the image-data recording area, the number of horizontal-direction pixels of the image represented by the image data, the number of vertical-direction pixels of the image represented by the image data, the offset (path) to the image data, a position-information flag indicating the absence or presence of position information (GPS information), a bar-code flag indicating the absence or presence of bar-code data, an offset (path) to the position information, the data size of position information, an offset to the bar-code data, the size of the bar-code data, an offset to the date of photography and the size of the date-of-photography data.

FIGS. 40 to 42 illustrate an example of the structure of the database 15 contained in the image database server 330.

FIG. 40 is a product information table.

The product information table is stored in the database 15 in advance by the operator of the image database server 330 before image data included in an image file transmitted from the image transmitting unit 320 is stored in the image file unit 17.

The product information table includes an area for storing a bar-code number, an area for storing a product name (FinePix 700), and an area for storing product information (product information 1 indicates a digital camera, product information 2 indicates the price and product information 3 indicates inventory) concerning the product name. By specifying the bar-code number, a product name and product information can be searched by referring to the product information table.

FIG. 41 is an image table.

The image table links a bar-code number and image data.

The image table includes an area which stores an image index for identifying image data, an area for storing a bar-code number, an area for storing date of photography and an area for storing position information. By knowing the bar-code number, it is possible to find image data identified by this bar-code number, the date of photography of the image represented by this image data and position information representing the location at which the image was captured.

FIG. 42 illustrates an index management database.

An image index is attached to each item of image data and is used to identify the image data. The index management database has an area for storing the current image index and an area for storing the next image index. The index management database makes it possible to prevent the assignment of redundant image indices to image data.

Figure 43:
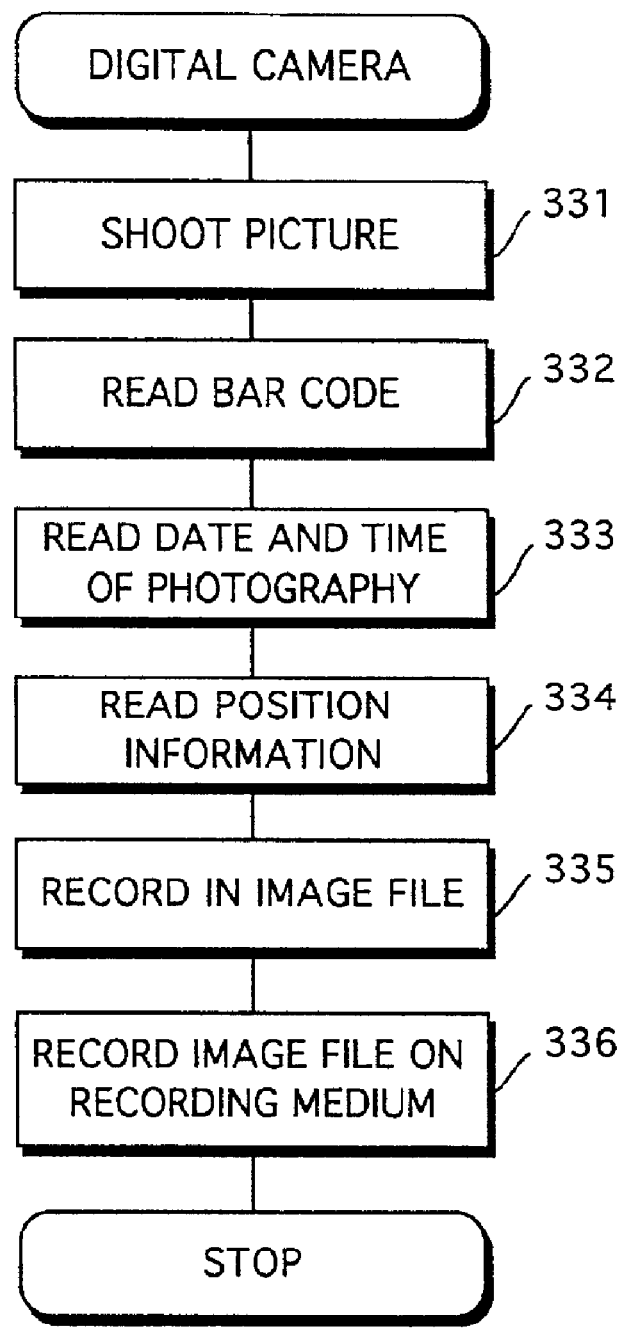
FIG. 43 is a flowchart illustrating the procedure of processing executed by the digital camera.
Figure 44:
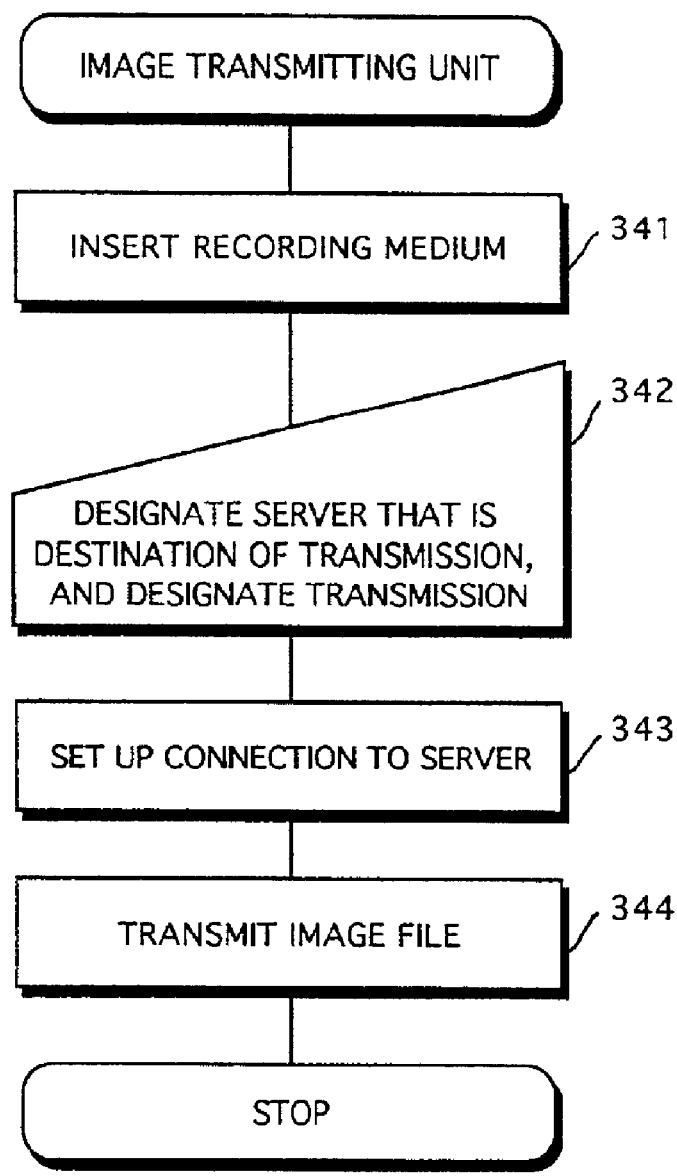
FIG. 44 is a flowchart illustrating the procedure of processing executed by the image transmitting unit.
Figure 45:
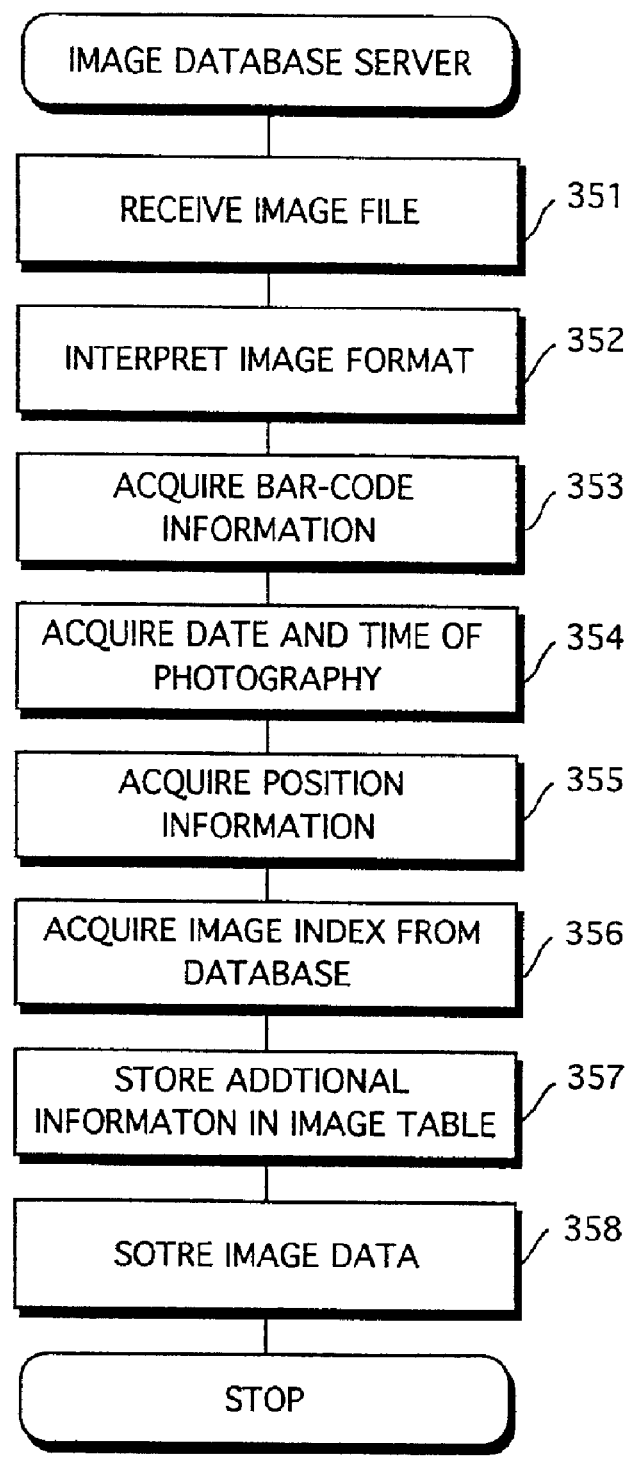
FIG. 45 is a flowchart illustrating the procedure of processing executed by the image database server.

FIGS. 43 to 45 are flowcharts illustrating processing procedures for when image data is recorded in the image database server 330.

FIG. 43 is a flowchart illustrating the procedure of processing executed by the digital camera 310.

An image of interest (generally a product to which a bar-code number has been assigned) is sensed by the image input unit 312 to obtain image data representing the image of interest (step 331). The image data representing the image of interest is input to the processing unit 313, where the image data is stored temporarily.

A bar code corresponding to the image of interest is read by the bar code reader 302 (step 332). Data representing the bar code is input to the digital camera 310 via the interface 311 and the data is applied to the processing unit 313. The date and time of photography is read from the timer 313A included in the processing unit 313 (step 333).

The digital camera 310 and GPS receiving unit 301 are connected. Position information obtained by the GPS receiving unit 301 is read by the processing unit 313 of the digital camera 310 via the interface 311 (step 334).

The image data is recorded in the image-data recording area of the image file in the processing unit 313, and the photography date-and-time data and position information are stored in the additional-information recording area of the image file (step 335). The image file is recorded by the image recording unit 314 on the recording medium 305 that has been inserted into the digital camera 310 (step 336).

FIG. 44 illustrates the procedure of processing executed by the image transmitting unit 320.

The recording medium 305 on which an image file has been recorded in accordance with the processing shown in FIG. 43 is inserted into the image transmitting unit (step 341). The image file is read out of the recording medium 305 and stored temporarily in the file transmitter 322.

The image database server 330 that is to be sent the image file is designated by the operator of the image transmitting unit 320 using the file transmitter 322 and this designation is applied (step 342).

When a connection is set up between the image database server 330 that is to be sent the image file and the image transmitting unit 320 (step 343), the image file is transmitted to the image database server 330 by the file transmitter 322 (step 344).

FIG. 45 illustrates the procedure of processing executed by the image database server 330.

The image file that has been transmitted from the image transmitting unit 320 is received by the image receiver unit 300 of the image database server 330 (step 351). The image file received by the image receiver unit 300 is applied to the image file processing unit 13, which proceeds to interpret the format of the received image file (step 352). When the format is interpreted, the bar-code data that has been recorded in the additional-information recording area of the image file is read (step 353). Further, the photography date-and-time data and position information are read from the additional-information recording area (steps 354, 355).

The next image index is then read from the index management database of the database 15 (step 356). The image index is updated as a result of reading the image index.

The bar-code number, date and time of photography and position information are recorded in the image table in accordance with the image index that has been read (step 357). The image data that has been recorded in the image-data recording area of the image file as image data identified by the read image index is recorded in the image file unit 17 (step 348).

An image table of the kind shown in FIG. 41 is thus generated in the database 15.

Figure 46:
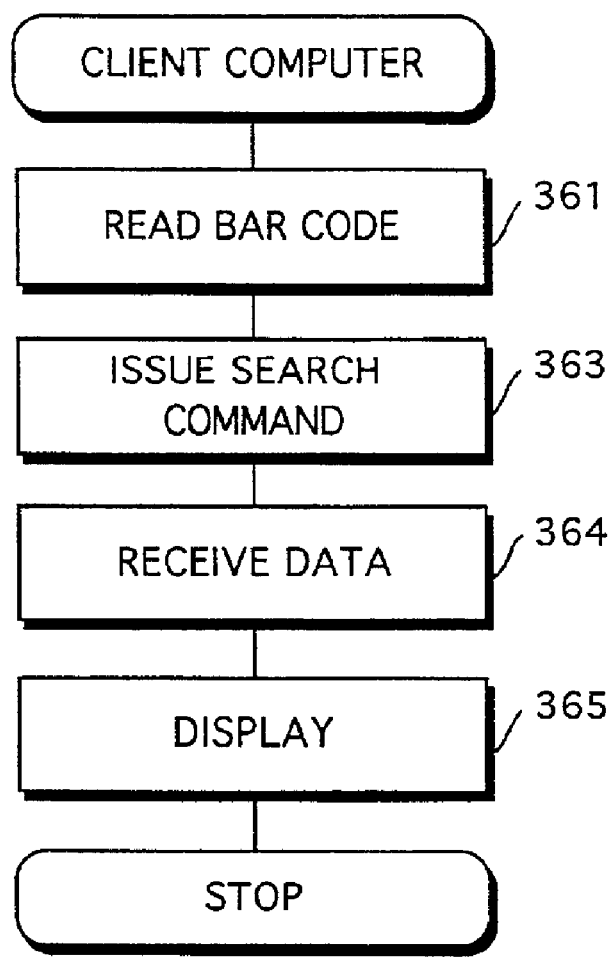
FIG. 46 is a flowchart illustrating the procedure of processing executed by the client computer.
Figure 47:
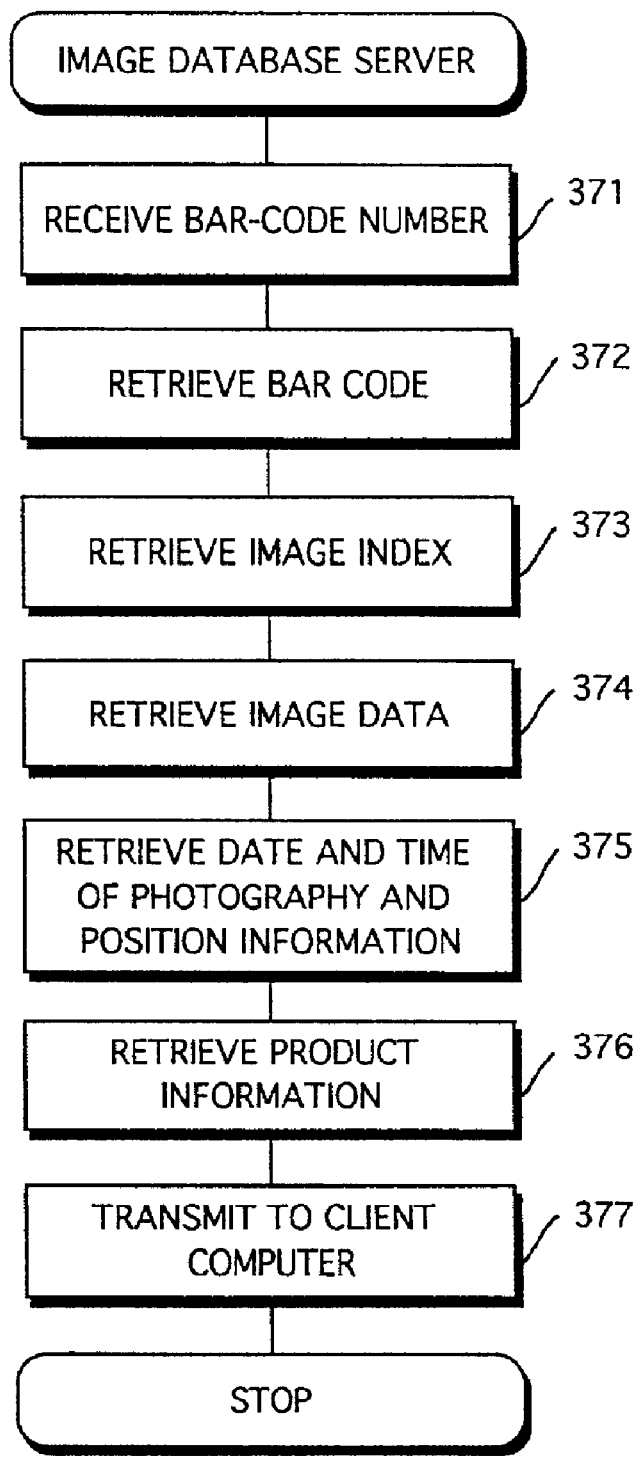
FIG. 47 is a flowchart illustrating the procedure of processing executed by the image database server.

FIGS. 46 and 47 are flowcharts illustrating the procedure of processing for conducting a search of image data. FIG. 46 illustrates the procedure of processing executed by the client computer 1, and FIG. 47 illustrates the procedure of processing executed by the image database server 330.

A bar code is read by the bar code reader 9 connected to the client computer 1 (step 361). A search command is specified by the user of the client computer 1, and the bar-code number and search command are transmitted to the image database server 330 (step 363).

The bar-code number is received by the Web server 11 of image database server 330 (step 371). When the bar-code number is received, it is applied to the database controller 14. The latter refers to the image table, which has been stored in the database 15, and searches for the image index that corresponds to this bar-code number (step 373). If the image index is found, it is applied to the image file controller 16. The image data identified by this image index is retrieved from the image file unit 17 by the image file controller 16 (step 374).

Further, the image table is referred to based upon the image index to retrieve the date and time of photography and the position information (step 375). It is of course possible to adopt an arrangement in which the date and time of photography and the position information are read out based upon the bar-code number.

Further, reference is had to the product information table to retrieve from the bar-code number the product name and product information specified by the bar-code number (step 376).

If the image data, date and time of photography, position information, product name and product information corresponding to the bar-code number are found by the image database server 330, these are transmitted to the client computer 1 (step 377).

Figure 48:
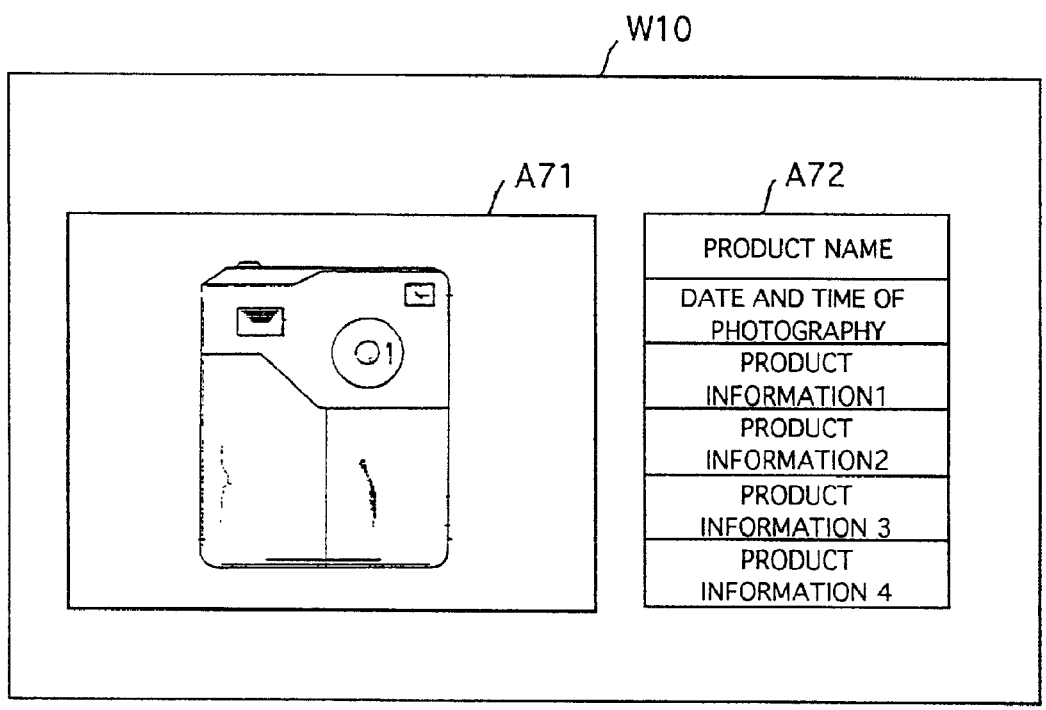
FIG. 48 illustrates an example of a window displayed on the display unit of the client computer.

The data representing the image data, date and time of photography, position information, product name and product information is received by the client computer 1 (step 364), whereupon a window W10 of search results of the kind shown in FIG. 48 is displayed (step 365).

The search-result window W10 includes areas A71 and A72. An image represented by image data that has been transmitted from the image database server 330 is displayed in the area A71, and the product name of the image being displayed in the area A71, the date and time of photography of this image and the product information are displayed in the area A72.

By reading the bar code, the user of the client computer 1 is not only capable of obtaining product information represented by the bar code but can also view the image of the product, the date and time of photography, etc.

As many apparently widely different embodiments of the present invention can be made without departing from the spirit and scope thereof, it is to be understood that the invention is not limited to the specific embodiments thereof except as defined in the appended claims.

What is claimed is:

1. An image data communication system in which a plurality of client computers and a server system are capable of communicating with each other via a network, wherein one of said client computers includes:
   an original-image data specifying unit for specifying original-image data that is to be transmitted to said server system; and
   an original-image data transmitting unit for transmitting the original-image data, which has been specified by said original-image data specifying unit, to said server system; and
   said server system includes:
   an original-image data receiving unit for receiving the original-image data transmitted from said original-image data transmitting unit;
   an image data generating unit, which responds to receipt of the original-image data by said original-image data receiving unit, for generating reduced-data-quantity image data of same format of two stages representing at least two images possessing data quantities of at least two stages in each of which the quantity of data is less than that of the original-image data; and
   a unit for associating the original-image data, which has been received by said original-image data receiving unit, and the reduced-data-quantity image data that has been generated by said image data generating unit.

2. The system according to claim 1, wherein said server system further includes a specific-format image data generating unit for generating image data including a predetermined specific data format that is independent of the data format of the original-image data.

3. The system according to claim 1, wherein said image data generating unit generates reduced-data-quantity image data of a prescribed format that is independent of the data format of the original-image data.

4. The system according to claim 1, wherein said server system further includes a memory in which the quantity of original-image data that can be stored is allocated beforehand to each client computer, said memory storing temporarily the original-image data that has been received by said original-image data receiving unit;
   said original-image data transmitting unit of said client computer sending said server system the original-image data including a data quantity less than the quantity of data allocated beforehand.

5. The system according to claim 4, wherein said server system further includes a data-quantity information transmitting unit for sending said client computer information representing a pre-allocated data quantity capable of being stored in said memory;
   said original-image data transmitting unit of said client computer sending said server system the original-image data including a data quantity less than the quantity of data allocated beforehand based upon said information, which represents the data quantity, transmitted from said data-quantity information transmitting unit of said server system.

6. The system according to claim 1, wherein said server system further includes a storage unit for storing the original-image data and the reduced-data-quantity image data of two stages.

7. The system according to claim 1, wherein said server system further includes a color adjustment unit for applying color adjustment processing to at least one item of image data among the original-image data and reduced-data-quantity image data of two stages.

8. The system according to claim 1, wherein said client computer further includes:
   a data specifying unit for specifying image data that is to undergo color adjustment among the original-image data and reduced-data-quantity image data of two stages; and
   a specifying-data transmitting unit for sending said server system specifying data which represents the image data that has been specified by said data specifying unit; and
   said server system further includes a specifying-data receiving unit for receiving the specifying data that has been transmitted from said specifying-data transmitting unit of said client computer;
   said color adjustment unit applying color adjustment processing to image data, which has been specified by said specifying data received by said specifying-data receiving unit, among the original-image data and reduced-data-quantity image data of two stages.

9. The system according to claim 6, wherein said client computer further includes a transmission requesting unit for sending said server system a request to transmit at least one item of image data among the original-image data and reduced-data-quantity image data of two stages that has been stored in said storage unit; and
   said server system further includes:
   a transmission-request receiving unit for receiving the transmission request transmitted from said transmission requesting unit of said client computer;
   a first reception-privilege determination unit for determining whether the privilege to receive image data specified by the transmission request received by said transmission-request receiving unit resides with the client computer that issued the transmission request; and
   a data transmitting unit, which is responsive to a determination by said first reception-privilege determination unit to the effect that the privilege resides with said client computer, for reading the image data specified by the transmission request out of said memory unit and transmitting this image data to said client computer, and which is responsive to a determination by said first reception-privilege determination unit to the effect that the privilege does not reside with said client computer, for sending said client computer data indicating that transmission is not allowed.

10. The system according to claim 6, wherein said server system further includes an end-message transmitting unit, which is responsive to storage of the original-image data and the reduced-data-quantity image data of two stages in said storage unit, for transmitting a message indicative of end of storage to said client computer that transmitted the original-image data.

11. The system according to claim 6, wherein said client computer further includes:
   an image search-condition input unit for inputting image search conditions; and
   an image search-condition transmitting unit for sending said client computer the image search conditions that have been input from said image search-condition input unit; and said server system further includes:
an image search-condition receiving unit for receiving image search conditions that have been transmitted from said image search-condition transmitting unit;
a search unit for searching, on the basis of the image search conditions received by said image search-condition receiving unit, at least one item of data among the original-image data and the reduced-data-quantity image data of two stages stored in said storage unit; and
a search-result information transmitting unit for sending said client computer information relating to results of the search conducted by said search unit.

12. The system according to claim 11, wherein said server system further includes a second reception-privilege determination unit for determining whether the privilege to receive image data, which has been found as a result of the search conducted by said search unit, resides with said client computer;
said search-result information transmitting unit, in response to a determination by said second reception-privilege determination unit to the effect that the reception privilege resides with said client computer, sending said client computer the image data found as a result of the search conducted by said search unit.

13. The system according to claim 1, wherein said client computer further includes an image display unit for displaying an image representing by image data of a prescribed format; and
said server system further includes a format conversion unit for converting the original-image data that has been received by said original-image data receiving unit to a format that is capable of being displayed by said image display unit;
said image data generating unit generating the reduced-data-quantity image data having a format that is capable of being displayed by said image display unit.

14. A server system capable of communicating with a client computer via a network, comprising:
an original-image data receiving unit for receiving the original-image data transmitted;
an image data generating unit, which responds to receipt of the original-image data by said original-image data receiving unit, for generating reduced-data-quantity image data of same format of two stages representing at least two images possessing data quantities of at least two stages in each of which the quantity of data is less than that of the original-image data; and
a unit for associating the original-image data, which has been received by said original-image data receiving unit, and the reduced-data-quantity image data that has been generated by said image data generating unit.

15. A method of controlling the operation of a server system capable of communicating with a client computer via a network, comprising:
receiving original-image data that is sent;
generating, in response to receipt of the original-image data, reduced-data-quantity image data of same format of two stages representing at least two images possessing data quantities of at least two stages in each of which the quantity of data is less than that of the original-image data; and
associating the original-image data that has been received and the reduced-data-quantity image data that has been generated.

16. A recording medium storing a program for controlling a server system capable of communicating with a client computer via a network, said program controlling a computer of the server system so as to:
receive original-image data that has been sent;
generate, in response to receipt of the original-image data, reduced-data-quantity image data of same format of two stages representing at least two images possessing data quantities of at least two stages in each of which the quantity of data is less than that of the original-image data; and
associate the original-image data that has been received and the reduced-data-quantity image data that has been generated.

17. An image data communication system in which a plurality of client computers and a server system are capable of communicating with each other via a network, wherein one of said client computers includes:
means for specifying original-image data that is to be transmitted to said server system; and
means for transmitting the original-image data, which has been specified by said means for specifying, to said server system; and
said server system includes:
means for receiving the original-image data transmitted from said means for transmitting;
means, which responds to receipt of the original-image data by said means for receiving, for generating reduced-data-quantity image data of same format of two stages representing at least two images possessing data quantities of at least two stages in each of which the quantity of data is less than that of the original-image data; and
means for associating the original-image data which has been received by said means for receiving, and the reduced-data-quantity image data that has been generated by said means for generating.

18. A server system capable of communicating with a client computer via a network, comprising:
means for receiving the original-image data transmitted;
means for generating, which responds to receipt of the original-image data by said means for receiving, for generating reduced-data-quantity image data of same format of two stages representing at least two images possessing data quantities of at least two stages in each of which the quantity of data is less than that of the original-image data; and
means for associating the original-image data, which has been received by said means for receiving, and the reduced-data-quantity image data that has been generated by said means for generating.

* * * * *